US012693896B2

(12) United States Patent
Davis et al.

(10) Patent No.: US 12,693,896 B2
(45) Date of Patent: Jul. 28, 2026

(54) SYSTEMS AND METHODS FOR IMPLEMENTING DISTRIBUTED SCHEDULING CAPABILITIES FOR COMPUTING CLUSTERS

(71) Applicant: Raytheon Company, Arlington, VA (US)

(72) Inventors: Trevor Dylan Davis, Melissa, TX (US); Franklin R. Tanner, Leesburg, VA (US); Alexander Valentinovich Shilov, Weatogue, CT (US); Massimiliano Chiodo, Berkeley, CA (US)

(73) Assignee: Raytheon Company, Arlington, VA (US)

( * ) Notice: Subject to any disclaimer, the term of this patent is extended or adjusted under 35 U.S.C. 154(b) by 476 days.

(21) Appl. No.: 18/192,917

(22) Filed: Mar. 30, 2023

(65) Prior Publication Data

US 2023/0315522 A1      Oct. 5, 2023

Related U.S. Application Data

(60) Provisional application No. 63/326,407, filed on Apr. 1, 2022.

(51) Int. Cl.
*G06F 9/46* (2006.01)
*G06F 9/48* (2006.01)
*G06F 11/34* (2006.01)

(52) U.S. Cl.
CPC ........ *G06F 9/4887* (2013.01); *G06F 11/3419* (2013.01)

(58) Field of Classification Search
CPC ........................... G06F 9/4887; G06F 11/3419
See application file for complete search history.

(56) References Cited

U.S. PATENT DOCUMENTS 7,433,931 B2    10/2008  Richoux
9,832,077 B2    11/2017  Ballew et al.
(Continued)

FOREIGN PATENT DOCUMENTS

CN          106027643 A      10/2016

OTHER PUBLICATIONS

Cambridge Systems at Scale (CamSaS), "The Evolution of Cluster Scheduler Architectures;" Blog posted on Mar. 9, 2016 on http://www.firmament.io/blog/scheduler-architectures.html; 5 Pages.
(Continued)

*Primary Examiner* — Gregory A Kessler

(74) *Attorney, Agent, or Firm* — Schwegman Lundberg & Woessner, P.A.

(57) ABSTRACT

In a method for distributing scheduling of a task within a plurality of nodes, a plurality of interconnected nodes is provided, each interconnected node accessing its own node database of performance data about the other nodes in the plurality. A first node in the plurality determines a task to be run by a node other than the first node, by a time deadline. A request to execute the task is sent from the first node to each node in a set of worker nodes. If task execution is completed before the time deadline, the set of worker nodes is notified. A penalty is associated at the first node, if the first node does not receive an indication that task execution was completed before time deadline. Performance data is updated for each worker node, indicating whether there was task execution success by the time deadline.

19 Claims, 7 Drawing Sheets

(56) References Cited

U.S. PATENT DOCUMENTS

| | | |
|---|---|---|
| 10,860,444 B2 | 12/2020 | Natanzon |
| 11,245,748 B1 | 2/2022 | Hannon |
| 2021/0157622 A1 | 5/2021 | Ananthapur Bache et al. |

OTHER PUBLICATIONS

Chemitiganti, "Kubernetes Concepts and Architecture;" Blog published on May 28, 2019 from https://platform9.com/blog/author/vamsi/; 20 Pages.

GitHub, "Kubernetes Cluster Federation;" Blog retrieved from https://github.com/kubernetes-sigs/kubefed#readme on Feb. 10, 2022; 5 Pages.

Magyari, "A Deep Dive into Kubernetes Federation v2;" Blog published on Jul. 22, 2019 from https://techblog.cisco.com/blog/multi-cloud-fedv2/; 19 Pages.

Platform9, "Kubernetes Federation: What it is and how to set it up;" Blog published on Feb. 4, 2020 from https://platform9.com/blog/kubernetes-federation-what-it-is-and-how-to-set-it-up/; 11 Pages.

Schwarzkopf et al., "Omega: Flexible, Scalable Schedulers for Large Compute Clusters;" Article from EuroSys '13: Proceedings of the 8th ACM European Conference on Computer Systems; Published Apr. 15, 2013; 14 Pages.

Younge et al., "A Tale of Two Systems: Using Containers to Deploy HPC Applications on Supercomputers and Clouds;" Proceedings of the 2017 IEEE International Conference on Cloud Computing Technology and Science (CloudCom); Dec. 2017; 8 Pages.

SYSTEMS AND METHODS FOR IMPLEMENTING DISTRIBUTED SCHEDULING CAPABILITIES FOR COMPUTING CLUSTERS

CROSS-REFERENCE TO RELATED APPLICATIONS

This application claims the benefit of U.S. Provisional Application No. 63/326,407, filed Apr. 1, 2022, and entitled "Systems and Methods for Implementing Distributed Scheduling Capabilities for Computing Clusters," which is incorporated herein by reference in its entirety.

FIELD

Embodiments of the disclosure generally relate to devices, systems, and methods for operation, scheduling, and optimizing performance of computer systems, including networks of nodes. More particularly, this disclosure relates at least to modifications of computer orchestration solutions to handle multiple concurrent schedulers to improve computer system performance.

BACKGROUND

Information processing systems have been evolving to better meet needs of users and optimize resource usage. Information processing systems, including computer networks, can use reconfigurable virtual resources to meet changing user needs in an efficient, flexible and cost-effective manner. There has been wide adoption of systems that use virtual resources, such as cloud computing systems and cloud storage systems, to improve resource allocation challenges. Running applications on physical servers can lead to resource allocation issues, such as one application taking up most of the resources and slowing down performance for other applications. In addition, dedicating a physical server to one application is costly, impractical, and inefficient, because scaling operations in this way can lead to under-utilization of the physical servers.

Virtualization, which enables running multiple virtual machines (VMs) on a single server CPU, was developed as an improvement for optimizing resources. Virtualization provides scalability and improved security (e.g., isolation of applications between virtual machines). VMs are not advantageous in all situations, however. For example, because each VM runs an Operating System (OS) image, binaries, and libraries within it, it can increase overhead usage easily, turning into several gigabytes or more fast. VMs can create performance bottlenecks, because VMs typically take minutes instead of seconds to start. In addition, VMs are not always portable when software is moved from one computing environment to another, which can present challenges, when users want to access services from multiple types of devices.

To overcome these types of limitations with VMs, another type of OS virtualization was developed: containers. A container is an executable unit of software that helps package and run software code, libraries, dependencies, and other parts of an application so that it can work reliably in different computing environments. Containers sit on top of the host server's hardware, allowing multiple containers to share the server's OS. The containers share the OS kernel, as well as libraries, binaries, and different software dependencies. Similar to a VM, a container includes all the necessary executables, binary code, libraries, configuration files, its own filesystem, share of CPU, memory, process space, etc. Because containers do not contain OS images, containers are more "lightweight" and portable, with relaxed isolation properties, enabling sharing of the underlying OS among applications. Containers are configured to work in any environment from on-premise to cloud to local machines A single container might be used to run anything from a small microservice or software process to a larger application. In larger application deployments, multiple containers may be deployed as one or more container clusters. Containers are often used in microservices architectures where each container represents a service, connected to the other services through the network. A microservices architecture allows each component to be deployed and scaled independently of the others.

When hundreds to thousands of containerized applications are deployed, however, additional solutions may be needed to manage the container clusters. Thus, various container orchestration and scheduling products (e.g., Hadoop, Omega, Kubernetes, Docker Swarm, and Apache Mesos) have been developed. Container orchestration and scheduling products provide a framework for managing containers and microservices architectures, including coordinating and organizing all aspects of individual containers, their functions, and their dynamic environments. For example, container orchestration can include controlling container deployment and scaling, managing when and how containers start and stop, scheduling and coordinating container activities, monitoring container health, distributing updates, and instituting failover and recovery processes. An exemplary container scheduler can be configured to start containers on the most appropriate host and connect them together. It has to handle failures by doing automatic failovers and it needs to be able to scale containers when there are too many data to process/compute for a single instance.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

The aforementioned advances in computer network technologies and virtualization, along with widespread availability of wireless technologies, have been key to enabling proliferation of the so-called the Internet of Things (IoT), which enables many billions of "things," including but not limited to machines, objects, devices, smart phones, computers, smart watches, automobiles, home appliances, personal electronic assistants, cameras, speakers, tracking devices, etc., to interconnect with each other, collect data and respond to the collected data, and/or to share the data. Availability of wireless network technology such as 5G and the like are helping to further expand the ability of networked computer devices to be dynamic and mobile, enabling the provision of multiple new services and capabilities for many types of users in multiple industries, including medical, military, commercial, financial, industrial, and the like. Further, the data collected by networked computer devices can be a bridge to so-called Big Data systems, as well.

Advances in virtualization, cloud computing, containers, and container orchestrations, also have potential to benefit other types of applications, such as high-performance computing (HPC), supercomputing, and other computing systems used by scientists and engineers for modeling, simulating, and analyzing complex physical or algorithmic phenomena. In addition, with the growth of Big Data and IoT, multiple businesses are transitioning into data centric organizations. Processing large data sets is driving organizations to consume large amounts of cloud resources and/or buy and maintain expensive data processing hardware systems.

Improvements in areas such as HPC, IoT, Big Data, etc., are sometimes being constrained by availability of compute resources and the ability to schedule, orchestrate, and/or optimize their use. For example, with HPC, improvements have been limited by architectural differences between a tightly coupled model of supercomputing/HPC versus the loosely coupled "microservices" architecture of containers. Current HPC machines are designed using numerous HPC clusters of one or more processors referred to as nodes. For most large scientific and engineering applications, performance is chiefly determined by parallel scalability and not the speed of individual nodes; therefore, scalability is often a limiting factor in building or purchasing such high-performance clusters. In addition, many HPC environments may not provide robust cluster management software for efficient operation in production-oriented environments.

Another scaling limitation involves the limitations with available container orchestration products. For example, the currently available open-source Kubernetes (1.22) orchestration solution supports a maximum cluster size of 5000 nodes with consistent/predictable configuration. In practice, clusters of even 500 can pose significant scaling challenges. The architecture does not scale well for some customers in the tactical and more dynamic environments where commercial assumptions hold true.

Still another limitation on advances in computing is the limited ability of enterprises to leverage spare compute resources that exist. Processing large data sets is driving organizations to consume large amounts of cloud resources and/or buy and maintain expensive data processing hardware systems. In addition, after such purchases, organizations often may end up with heterogeneous clusters (i.e., a cluster environment that can contain processors and devices with different bandwidth and computational capabilities), because organizations constantly may be purchasing new and different types of hardware and data processing systems. Consequently, businesses/customers are leaving "untapped" resources available in their enterprise pool by not leveraging the spare compute resources that exist.

These issues can be further compounded by the way an enterprise evolves and matures, which can sometimes create processing pools that are underutilized as one or more groups within the enterprise may not know how to access the resources. For example, a given corporation may have different research and development divisions, each with their own respective HPC clusters with mixed graphics processing units (GPUs), field programmable gate arrays (FPGAs), and central processing units (CPUs), that do not have easy connectivity between them. Further, portions of these clusters may sit idle while other pieces are overtaxed. Finally, even desktop computers used to interface with large clusters remain idle throughout much of a given 24 hour period and are often used only during a standard 8 hour work day. Tools available today do not readily support an approach for heterogenous processing. Instead, such tools rely on a known and predictable state of the system, then let an orchestration and/or scheduling solution (such as Kubernetes) handle managing workloads. Some scheduling solutions have been attempted to overcome at least some of these issues, but some of these are configured or for large data centers and still contains underlying assumptions about the configuration of the system.

In certain embodiments, the specific scheduler modifications, processes, and algorithms provided herein (including a job speed up metric algorithm, a computation cost model, and a decentralized scheduling algorithm, each of which is described further herein) help to implement a peer-to-peer scheduling capability that is compliant with various open-source platforms, including application program interfaces (APIs) of those that are configured for managing containerized workloads and services, such as Kubernetes API. This peer-to-peer scheduling capability, in certain embodiments, provides functionality enabling containerized workloads to be able to handle distributed state algorithms. Advantageously, at least some embodiments herein are configured to operate even with no prior knowledge of the system they are operating with, such that the systems and methods of the embodiment are able to learn dynamically (e.g., as requests are sent to nodes to perform tasks and/or as notifications of task completions are received) how to best satisfy and complete the request quickly. With at least some embodiments, any node is able to be removed from the system (maintenance, destroyed, removed, or any other connection disruption) without disturbing the overall completion of requests. In certain embodiments, modifications are made to at least some of the open source protocols (e.g., to modify a protocol like the Kubernetes "gossip" protocol) to predict the nodes expected communication patterns to allow for not labeling nodes as unhealthy unless threshold has been exceeded.

In some embodiments, one or more distributed state scheduling algorithms are applied underneath a Standard Orchestration System. This arrangement, in certain embodiments, allows any compliant open source deployment (including but not limited to Kubernetes) to leverage one or more advantageous features of the embodiments to gain concurrent execution of requests and support environments with less predictable configurations.

At least some embodiments herein provide systems and methods to address at least some of these issues. In one aspect, a method of distributing scheduling of a task within a plurality of nodes, is provided. The method includes (a) providing a plurality of interconnected nodes, each respective interconnected node accessing its own respective node database of performance data about the other nodes in the plurality. The method also includes (b) determining, at a first node in the plurality of nodes, a first task to be run for the first node, by a predetermined time deadline, wherein the first task is configured to be run by a node other than the first node. The method also includes (c) selecting a first set of worker nodes from the plurality of interconnected nodes, wherein the first node selects each respective worker node in the first set based on the respective performance data that the first node accesses about the respective worker node. The method also includes (d) sending, from the first node to each node in the first set of worker nodes, a request to execute the first task. The method also includes (e) notifying, if the first node receives an indication that execution of the first task was completed by a second node in the first set before the predetermined time deadline, the first set of worker nodes that the first task is complete. The method also includes (f) associating a first penalty at the first node, if the first node does not receive an indication that execution of the first task was completed before the predetermined time deadline. The method also includes (g) updating performance data, accessed by the first node, for each worker node in the first set of worker nodes, the updating indicative of whether or not the respective worker node succeeded in executing the first task by the predetermined time deadline.

In some embodiments of this aspect, the method further comprises (h) selecting a second set of worker nodes from the plurality of interconnected nodes, wherein the first node selects each respective worker node in the first set so that the second set of worker nodes comprises at least one worker node that was not in the first set; and (i) repeating (d) through (g) using the second set of worker nodes. In some embodiments, the first node is configured to run a mission comprising a plurality of tasks and is further configured to repeat (b) through (e) for each of the plurality of tasks. In some embodiments, the method further comprises (h) updating performance data, accessed by the first node, for each worker node in the first set of worker nodes, the updating indicative of whether or not any one or more of the respective worker nodes have spare computing resources. In some embodiments, the method further comprises (h) configuring each respective worker node in the first set that received a notification that the first task is complete, to stop any instances of the first task running at that node.

In some embodiments, is implemented within a Kubernetes system. In some embodiments, the first penalty corresponds to a Penalty-based Cost Function that is determined based on an expected outcome of a job execution, wherein an expected penalty EPj associated to failing to complete a job j by a node expresses a likelihood that a penalty is incurred if the node attempts to run job j, and is defined by an equation:

$$EPj = Vj(1 - |Cj|),$$

where $V_j$ is the job value, and $|C_j|$ is a probability that the job j will be completed in time.

In some embodiments, of this aspect, the performance data comprises data specifying computing resource capability information for each of the other respective nodes in the plurality of interconnected nodes. In some embodiments of this aspect, the performance data comprises data specifying, for each of the other respective nodes in the plurality of interconnected nodes, a set of historical data about each other respective node's responses to at least one past task execution request from the respective interconnected node that accesses the database.

In another aspect, a system of distributing scheduling of a task within a plurality of nodes, is provided. The system comprises a plurality of interconnected nodes, a processor, and a memory. In the plurality of interconnected nodes, each respective interconnected node accesses its own respective node database of performance data about the other nodes in the plurality. The processor and memory are provided at a first node of the plurality of interconnected nodes, the memory storing instructions executable on the processor.

The instructions cause the processor to: determine, at the first node in the plurality of nodes, a first task to be run for the first node, by a predetermined time deadline, wherein the first task is configured to be run by a node other than the first node; select a first set of worker nodes from the plurality of interconnected nodes, wherein the first node selects each respective worker node in the first set based on the respective performance data that the first node accesses about the respective worker node; send, from the first node to each node in the first set of worker nodes, a request to execute the first task; notify, if the first node receives an indication that execution of the first task was completed by a second node in the first set, before the predetermined time deadline, the first set of worker nodes that the first task is complete; associate a first penalty at the first node if the first node does not receive an indication that execution of the first task was completed before the predetermined time deadline; and update performance data, accessed by the first node, for each worker node in the first set of worker nodes, the updating indicative of whether or not the respective worker node succeeded in executing the first task by the predetermined time deadline.

In some embodiments, the memory is further configured for storing instructions executable on the processor, the instructions causing the processor to update performance data, accessed by the first node, for each worker node in the first set of worker nodes, the updating indicative of whether or not any one or more of the respective worker nodes have spare computing resources. In some embodiments, the memory is further configured for storing instructions executable on the processor, the instructions causing the processor to configure each respective worker node in the first set that received a notification that the first task is complete, to stop any instances of the first task running at that node. In some embodiments, the system comprises a Kubernetes system.

In some embodiments, the performance data comprises data specifying computing resource capability information, for each of the other respective nodes in the plurality of interconnected nodes. In some embodiments, the performance data comprises data specifying, for each of the other respective nodes in the plurality of interconnected nodes, a set of historical data about the other respective node's responses to at least one past task execution request from the respective interconnected node that accesses the database.

In a further aspect, a method of determining computational capacity of a node, is provided. The method comprises defining a computation space having an area that denotes a total computation capacity of a node, wherein dimensions of the computation space are measured in units of computation (UoC). The method also comprises defining a first task in terms of the total first UoC that the first task requires. The method also comprises determining, for the node, whether it can run the first task based on whether the total first UoC that the first task requires, can be formed into at least a first shape that fits entirely within the area of the computation space.

In some embodiments, the method further comprises defining a second task in terms of a total second UoC that the second task requires; and determining for the node, whether it can run both the first task and the second task based on whether the computation space can fit both the first shape and a second shape formed based on the total second UoC. In some embodiments, the first shape comprises a first dimension associated with at least one of a minimum degree of parallelism and a maximum degree of parallelism, associated with the total first UoC that the first task requires. In some embodiments, the first shape comprises a first dimension associated with a minimum degree of parallelism and a second dimension associated with a maximum degree of parallelism. In some embodiments, the first shape comprises a rectangle and wherein the minimum degree of parallelism corresponds to a minimum height of the rectangle, in terms of UoC, and wherein the maximum degree of parallelism corresponds to a maximum height of the rectangle, in terms of UoC.

$$T_j = t * \frac{S_n}{S_b} * \frac{CPUs}{1000}$$

In another aspect, a method of estimating performance of a computing node network comprising heterogenous nodes is provided. The method comprises defining a reference speed per core ($S_b$) for a first known node in the computing node network. The method also comprises receiving performance data for a second node in the network that has performed a predetermined task, the performance data comprising: a speed $S_n$ of a CPU at the second node, a number of processing cores (CPUs) used to perform the predetermined task, and a total actual time the second node took to perform the predetermined task. The method also comprises determining an expected time $T_j$ that that the second node was expected to have performed the predetermined task, based on the reference speed per core and on the performance data wherein the expected time is computed as:

$$T_j = t * \frac{S_n}{S_b} * \frac{CPUs}{1000}$$

The method also comprises determining a job speed-up metric $J_{su}$, corresponding to an estimate of whether the computing node network can perform at least one of speeding up job execution or slowing down job execution, wherein $J_{su}$ is computed as:

$$J_{su} = \frac{T_j}{T_n}.$$

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which.

The drawings are not to scale, emphasis instead being on illustrating the principles and features of the disclosed embodiments. In addition, in the drawings, like reference numbers indicate like elements.

DETAILED DESCRIPTION

Figure 1:
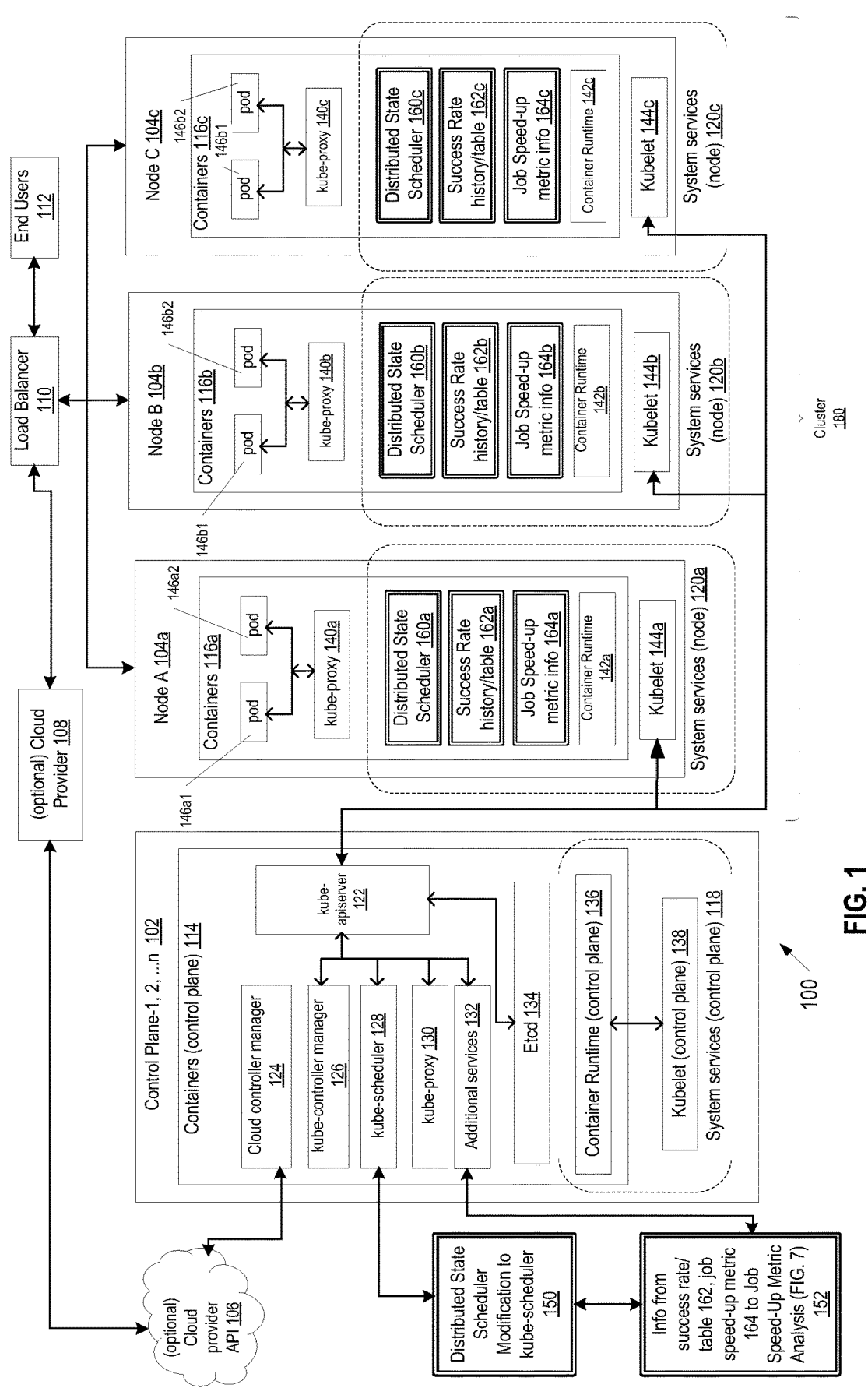
FIG. 1 is a block diagram of a modified orchestration system configured for implementing a peer-to-peer scheduling capability, in accordance with one embodiment.

Before describing details of the particular systems, devices, and methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

For convenience, certain concepts and terms used in the specification are collected here. The following terminology definitions may be helpful in understanding one or more of the embodiments described herein and should be considered in view of the descriptions herein, the context in which they appear, and knowledge of those of skill in the art.

"Computer network" refers at least to methods and types of communication that take place between and among components of a system that is at least partially under computer/processor control, including but not limited to wired communication, wireless communication (including radio communication, Wi-Fi networks, BLUETOOTH communication, etc.), cloud computing networks, telephone systems (both landlines and wireless), networks communicating using various network protocols known in the art, military networks (e.g., Department of Defense Network (DDN)), centralized computer networks, decentralized wireless networks (e.g., Helium, Oxen), networks contained within systems (e.g., devices that communicate within and/or to/from a vehicle, aircraft, ship, weapon, rocket, etc.), distributed devices that communicate over a network (e.g., Internet of Things), and any network configured to allow a device/node to access information stored elsewhere, to receive instructions, data or other signals from another device, and to send data or signals or other communications from one device to one or more other devices.

"Computer system" refers at least to processing systems that could include desktop computing systems, networked computing systems, data centers, cloud computing and storage systems, as well as other types of processing systems comprising various combinations of physical and virtual processing resources. A computer system also can include one or more desktop or laptop computers, and one or more of any type of device with spare processing capability. A computer system also may include at least one data center or other type of cloud-based system that includes one or more clouds hosting tenants that access cloud resources.

"Cloud computing" is intended to refer to all variants of cloud computing, including but not limited to public, private, and hybrid cloud computing. In certain embodiments, cloud computing is characterized by five features or qualities: (1) on-demand self-service; (2) broad network access; (3) resource pooling; (4) rapid elasticity or expansion; and (5) measured service. In certain embodiments, a cloud computing architecture includes front-end and back end components. Cloud computing platforms, called clients or cloud clients, can include servers, thick or thin clients, zero (ultra-thin) clients, tablets and mobile devices. For example, the front end in a cloud architecture is the visible interface that computer users or clients encounter through their web-enabled client devices. A back-end platform for cloud computing architecture can include single tenant physical servers (also called "bare metal" servers), data storage facilities, virtual machines, a security mechanism, and services, all built in conformance with a deployment model, and all together responsible for providing a service. In certain embodiments, a cloud native ecosystem is a cloud system that is highly distributed, elastic and composable with the container as the modular compute abstraction. One type of cloud computing is software as a service (SaaS), which provides a software distribution model in which a third-party provider hosts applications and makes them available to customers over a network such as the Internet. Other types of cloud computing can include infrastructure as a service (IaaS) and platform as a service (PaaS).

"Supercomputing" at least refers to the processing of hugely complex or data-laden tasks using the combined resources of multiple computers working in parallel (i.e., using a supercomputer). Computers used for supercomputing ("supercomputers") are powerful enough to handle high performance computing, in contrast to a general purpose computer. The hardware structure or architecture of supercomputers determines their efficiency. Some types of super-computers use more than one central processing unit (CPU) and/or more than one graphics processing unit (GPU), where the multiple CPUs and/or GPUs are grouped into compute nodes, comprising a processor or a group of processor (referred to as symmetric multiprocessing (SMP)) and a memory block. An exemplary supercomputer can contain tens of thousands of nodes that can be interconnected to collaborate on solving a specific problem. Supercomputers are used for highly intensive calculation tasks for projects ranging from quantum physics, weather forecasting, physical simulations, and molecular modeling, simulations of aircraft in various environmental, conditions, splitting electrons, detonation of nuclear weapons, oil and gas exploration, and more.

"High performance computing" (HPC) at least refers to the use of supercomputers and parallel computing techniques (i.e., when a number of compute elements work in parallel) to solve complex computational problems. While supercomputing typically refers to the process of complex and large calculations used by supercomputers, HPC involves the use of multiple supercomputers to process complex and large calculations (sometimes supercomputing and HPC are used interchangeably in the art). HPC can be used in a wide variety of applications such as structural analysis, computational fluid dynamics, oil exploration, atmospheric sciences, defense applications, virtual reality, computational chemistry, finance, transportation, etc. HPC architecture is influenced by the lowest-level technologies and circuit design, and how they can be most effectively employed in supercomputers.

"Container" refers at least to a standard unit of software that packages up necessary elements (including, e.g., code, runtime, system tools, system libraries, and software dependencies, etc.) so the application runs quickly, easily and reliably across different computing environments, i.e., any computer hardware, infrastructure, and/or cloud environment. Containers have an isolated nature that affords multiple benefits: software in a container will run the same in different environments; containers also minimize installation issues, including system conflicts, version incompatibilities, and missing dependencies; and software in a container does not affect host operating system and does not modify system settings or resources, which helps improve security.

"Orchestration" refers at least to automated arrangement, coordination, and management of complex computer systems, and services, including software units such as containers. Orchestration also refers to the coordinating and sequencing of different activities. For containers, orchestration automates operational effort required to run container-ized workloads and services, such as provisioning, deployment, scaling (up and down), networking, load balancing and the like. Orchestration tools can help to coordinate clustered pools of resources and are able to host containers, allocate resources to containers in a consistent manner, and allow containers to work together in a predictable environment.

"Scheduling" refers to the assignment of workloads, where they can most efficiently run. Scheduler applications generally control unattended background program execution of jobs. For example, with containers, schedulers help to locate nodes which are capable of executing a container and provisioning the instance; a container scheduler can be configured to start containers on the most appropriate host and connect them together and is configured to handle failures by doing automatic fail-overs. Container schedulers also can scale containers when there is too much data to process/compute for a single instance. Various types of scheduler architectures exist, each with advantages and disadvantages, including but not limited to:

Monolithic scheduler architectures (e.g., Kubernetes, Hadoop v1), which use a single, centralized scheduling algorithm for all jobs, where all workloads are handled by the same scheduler, and all tasks run through the same scheduling logic. In some versions, there may be a central (primary) node that performs the necessary delegations and scheduling assigned to other (worker) nodes.

Two-level scheduler architectures (e.g., Hadoop-on-Demand, Mesos), which have a single active resource manager that offers compute resources to multiple parallel, independent "scheduler frameworks." For example, two level schedulers are often configured to separate the concerns of resource allocation and task placement, allowing task placement logic to be tailored towards specific applications, but also maintaining an ability to share the cluster between them.

Shared-state scheduler architectures (e.g., Google Omega, Microsoft Apollo, Hashicap Nomad), which provide a semi-distributed model in which multiple replicas of cluster state are independently updated by application-level schedulers. Sometimes shared-state schedulers must work with stale information (unlike a centralized scheduler), and such shared-state schedulers may experience degraded scheduler performance under high contention.

Fully-distributed scheduler architectures (e.g., Sparrow), which provides no coordination between schedulers (no central control) at all; rather, they use many independent schedulers to service the incoming workload, where each scheduler works purely with its local, partial, and often out-of-date view of the cluster. Jobs can typically be submitted to any scheduler, and each scheduler may place tasks anywhere in the cluster. Because there is no central control, fully-distributed schedulers can have difficulty enforcing priority precedence and fairness policies, or complex or application-specific scheduling policies, which can increase interference between tasks.

Hybrid scheduler architectures (e.g., Tarcil, Mercury, Hawk), which attempt to address drawbacks of fully distributed architectures by combining them with monolithic or shared-state designs. For example, a hybrid scheduler architecture can provide two scheduling paths: a distributed one for part of the workload (e.g., very short tasks, or low-priority batch workloads), and a centralized one for the rest.

"Microservice architecture" at least refers to an architectural style for building a distributed application using containers. Each function of the application operates as an independent service. A microservice architecture allows for each service to scale or update without disrupting other services in the application and creates a massively scalable and distributed system, which avoids the bottlenecks of a central database and improves business capabilities, such as enabling continuous delivery/deployment applications and modernizing the technology stacks. A microservice architecture enables the rapid, frequent and reliable delivery of large, complex applications. It also enables an organization to evolve its technology stack.

"Kubernetes" at least refers to an open source container management platform providing portable, extensible open-source platform for managing containerized workloads and services, which facilitates both declarative configuration and automation. Kubernetes can be viewed at least as a container platform, a microservices platform, and a portable cloud platform. Kubernetes typically can run containers, such as Docker containers. Although Google originally designed Kubernetes, as of this writing, Kubernetes is an open source project managed by the Cloud Native Computing Foundation (CNCF) of San Francisco, CA.

"Internet of Things" (IoT) refers at least a broad range of internet-connected devices capable of communicating with other devices and networks, where IoT devices can include devices that themselves can process data as well as devices that are only intended to gather and transmit data elsewhere for processing. An IoT can include a system of multiple interrelated and/or interconnected computing devices, mechanical and digital machines, objects, animals or people that are provided with unique identifiers (UIDs) and the ability to transfer data over a network without requiring human-to-human or human-to-computer interaction. Even devices implanted into humans and/or animals can enable that human/animal to be part of an IoT.

Unless specifically stated otherwise, those of skill in the art will appreciate that, throughout the present detailed description, discussions utilizing terms such as "opening", "configuring," "receiving,", "detecting," "retrieving," "converting", "providing,", "storing," "checking", "uploading", "sending,", "determining", "reading", "loading", "overriding", "writing", "creating", "including", "generating", "associating", and "arranging", and the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

Before describing in detail the particular improved systems, devices, and methods, it should be observed that the concepts disclosed herein include but are not limited to a novel structural combination of software, components, and/or circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

The following detailed description is provided, in at least some examples, using the specific context of an exemplary orchestration system (the Kubernetes system and its scheduler) and modifications and/or additions that can be made to such a system to achieve the novel and non-obvious improvements described herein. For example, in at least some embodiments, the container management system comprises a Kubernetes system, though all embodiments are not so limited. Other container management systems similar to Kubernetes may also be used, and specific reference to Kubernetes is meant to be primarily for example or illustration. Moreover, those of skill in the art will appreciate that the disclosures herein are not, of course, limited to only the Kubernetes system but are readily adaptable to many different types of container management, orchestration and scheduling systems.

FIG. 1 is a block diagram of a modified orchestration system 100 configured for implementing a peer-to-peer scheduling capability, in accordance with one embodiment. The modified orchestration system 100 is based on a Kubernetes type of system. The system 100 of FIG. 1 includes, e.g., a standard Kubernetes control plane 102 in operable communication with a plurality of nodes 104a, 104b, 104c. Kubernetes is an environment known in the art and referenced and described e.g., in U.S. Patent Publication No. 2021/0157622 ("ORCHESTRATION OF KUBERNETES MASTER NODE") and U.S. Pat. No. 10,860,444 ("SEAMLESS MOBILITY FOR KUBERNETES BASED STATEFUL PODS USING MOVING TARGET DEFENSE") (hereinafter '444 patent), each of which is hereby incorporated by reference. Thus, the specific components of the Kubernetes control plane 102 are not described in great detail in this disclosure other than in general terms as well as in terms of how this disclosure modifies and improves them.

In certain embodiments herein, a modified scheduler architecture for the system 100 of FIG. 1 and a modified scheduling process for the distributed system of interconnected assets (e.g., the nodes 104 of FIG. 1), enable the creation of an ad-hoc computing cluster that can provide a supercomputer-like functionality, similar to the Folding@Home (F@H) distributed computing project. As is known in the art, the F@H paradigm provides an ability to leverage spare compute cycles to solve problems such as protein dynamics. The objective of F@H is to create an ad-hoc supercomputer to perform protein folding (and other simulations of protein dynamics) in an attempt to find treatments for a variety of diseases, such as COVID-19, Alzheimer's, and cancer. F@H is a distributed computing project that is reliant on simulations run on volunteers' personal computers.

Attempting to provide an F@H type of architecture can be challenging in some existing computing environments. Some environments (e.g., cloud, data-center, forward deployed data-center, low size weight and power (SWAP) edge computing) may feature heterogenous processing resources. These processing resources may comprise a single node or may be made up of multiple nodes. However, in some environments, not all functions can be executed on "node." In some environments, there is not a consistent number of resources, and resources need to be able to come and leave the network. In some environments, the underlying system needs to be able to support all types of processing. In some environments, resources need to be able to govern the processing deployed to them. In some environments, connections between nodes will contain varying latency and bandwidth.

In certain embodiments herein, an arrangement is provided to create an architecture similar to F@H, but instead of relying on a worldwide network of volunteer user computers, the embodiment leverages tools and technologies that are core to the business of a given enterprise, especially where the enterprise's technologies include a technology "stack" that implements containerization and microservice driven designs. In certain embodiments, the provided solution modifies certain aspects of existing scheduling and/or orchestration tools that are common throughout existing computing environments like the Kubernetes environment 100 of FIG. 1 to create an F@H-like computer architecture paradigm, including a peer-to-peer scheduling capability between the nodes 104.

In one aspect of this, in certain embodiments, an approach is provided that is able to modify the monolithic scheduler architecture of Kubernetes (e.g., the kube-scheduler 128) to allow the kube-scheduler 128 to be able to handle multiple concurrent schedulers (i.e., a distributed state scheduler 160 at each node 104) trying to process jobs/applications being requested to be scheduled. In certain embodiments, one or more modifications of a scheduler, such as the Kubernetes scheduler, to support a distributed State Scheduler, allow for a federated scheduling paradigm that does not exist today. In certain embodiments, this is accomplished via implementation of an arrangement that incorporates additional processes, including a computation cost model process (FIGS. 4-6) and a job speed-up metric and process (FIG. 7) that is configured to help estimate, correctly, the ability of a heterogeneous network to run heterogenous jobs optimally. This is described further herein.

Referring again to FIG. 1, the normally monolithic Kubernetes kube-scheduler 128 is modified, via the distributed state scheduler modification 150, to deal with a cluster (grouping of nodes), e.g., the cluster 180 of FIG. 1. In certain embodiments, this modification includes a peer-to-peer approach (described further herein in connection with FIGS. 2 and 3) that considers the stability (and/or health) of the network, including past performance of nodes, e.g., in response to past requests. In certain embodiments, this is accomplished via an arrangement that provides a scheduling process for a distributed system of interconnected assets having no central control. This is also described further herein.

The solution provided herein via the modifications shown in FIG. 1, including the combination, in certain embodiments, of one or more of the job speed up metric, peer-to-peer scheduler (for a distributed system of interconnected assets having no central control, and computation cost processes, and the scheduling process, enables creation of an ad-hoc computing cluster similar to F@H, where the ad-hoc computing cluster can be created using whatever assets are available within and across a given enterprise. In at least some embodiments, the provided solution creates a computing infrastructure (advantageously, an HPC architecture) across all of the distributed, heterogeneous resources that exist in an enterprise. In certain embodiments, the provided solution means that developers no longer have to worry about compute resources; instead, the provided solution is configured to look across all known resources to satisfy a given request (even if such resources may not even be known to developers requesting the resources). In certain embodiments, a benefit of the provided solution is any application developed against an API associated with the modified scheduler (e.g., the Kubernetes Open-Source API) is able to integrate with zero changes allowing seamless integration into existing enterprises.

As seen in FIG. 1, an exemplary Kubernetes environment can have one or more control plane nodes (also known as master nodes) 102 and one more worker nodes 104. The Control Plane node 102, in an exemplary Kubernetes system, manages the worker nodes 104 and the pods 146 in the cluster. Those of skill in the art will appreciate that the modifications proposed to aspects of the control plane 102 described herein, although shown and described for illustrative purposes as a Kubernetes control plane, are not limited only to Kubernetes control planes, but are applicable to control planes associated with other orchestration and scheduling environments (including but not limited to Mesos, Omega, etc.). Although not shown in FIG. 1, some arrangements may have more than one master node in the cluster to check for fault tolerance. The worker nodes 104 host the pods 146 that are the components of the application workload. Optionally, the system 100 may include one or more cloud providers 108, each associated with a respective cloud provider API 106. As is understood, there are no cloud providers 197 if the system 100 is running on bare metal. Components running on the control plane node include the following (refer to the aforementioned '444 patent for more detailed information):

etcd 134, which stores the cluster state, including configuration details;

kube-api-server 122, which serves as the front end for the control plane 102, exposing the Kubernetes API, acting as a main manager, and is the only component which accesses the etcd 124, serving as an entry point for all the REST commands used for controlling the cluster 180;

kube-controller manager 126 provides a collection of control processes to manage various resources, monitors when nodes 104 go down, and maintains the correct number of pod 146s;

cloud controller manager 124 (optionally provided if using a cloud provider 108) runs controllers that provision underlying infrastructure needed by workloads and also can manage storage volumes if needed;

kube-proxy 130 (and also in worker nodes as kube-proxy 140), in certain embodiments, acts as a load balancer and network proxy to perform service on a single worker node (although not shown in FIG. 1, for clarity, the kube-proxy 130 is what is providing, in some embodiments, the load balancing function 110 shown in FIG. 1). Kube-proxy 130/140 also is used to communicate between the multiple worker nodes 104;

Pods 146 are a combination of single or multiple containers that logically run together on worker nodes 104, such as a group of one or more containers that are deployed together on the same host, where containers can easily communicate with other containers in the same pod 146 as though they were on the same machine;

kube-scheduler 128—in conventional Kubernetes, the kube-scheduler 128 assigns workloads (e.g., schedules tasks) to the worker nodes (also referred to as slave nodes) and decides which nodes pods will be run on. The scheduler also stores the resource usage information for every slave node and is responsible for distributing the workload. The kube-scheduler also helps track how the working load is used on cluster nodes and helps place the workload on resources which are available and accept the workload.

The kube-scheduler 128 is a component of Kubernetes that is proposed for modification, in accordance with certain embodiments, to be replaced with a distributed state scheduler capability 150, which is instead provided on each node 104 as a respective distributed state scheduler 160 (discussed further below). That is, the kube-scheduler 128 is modified, in certain embodiments herein, to be able to handle one or more distributed state algorithms (e.g., as described in the flowcharts of FIGS. 2-4 and 7 discussed further herein). Inputs to how the distributed state scheduler modification 150 works, include, as shown in FIG. 1, information 152, such as information from the success rate table 162 (discussed further below), information from a job speed up metric 164, and information from a job speed up metric analysis (discussed further herein). As part of this, each node 104 is configured to track its success rate history in executing/handling tasks, e.g., in a respective table 162. This is discussed further herein.

As shown in FIG. 1, each node, be it a control plane node 102 or a worker node 104, corresponds to a single host which is capable of running on a physical or virtual machine. For example, each worker node 104 is configured to run a respective kube-proxy 140 and kubelet service 144, which are considered as a part of the cluster. The cluster 180 of nodes (e.g., for illustrative purposes only, node A 104*a*, node B 104*b*, and node C 104*c*) corresponds to a collection of hosts (servers) that whose resources (e.g., RAM, CPU, disk, devices) can be aggregated into a usable pool. Each worker node 104 runs a respective kubelet service 144 that is configured to relay information to and from the control plane 102 to the node 104. As is understood, on each worker node 104 there are multiple pods 146 running (and, although not shown in FIG. 1, there can be multiple containers running in pods 146). Each worker node 104 also runs one or more containers 116, such as Docker containers that run the pods 146. As is understood, container runtime 142 is configured for running containers. Kubernetes supports several container runtimes: e.g., Docker, containers.

In a conventional orchestration environment, such as Kubernetes, a scheduler (e.g., kube-scheduler 128) is an important service running on the master control plane node 102 and is configured for distributing the workload or containers across multiple worker nodes 104, as well as tracking the utilization of the workload (e.g., one or more tasks) on nodes in a cluster 180, and putting the workload on resources that are available and which can accept the workload. However, the conventional kube-scheduler 128 can become a bottleneck and also, in some environments (e.g., Kubernetes) is limited as to how many worker nodes 104 to which it can distribute workload. Because of these limitations, the potential for a given environment (e.g., a master or control plane node 102 and plurality of worker nodes 104) to be able to provide features such as supercomputing and/or HPC functionality, can be limited.

One aspect of the kube-scheduler 128 is that it is designed so that it can be replaced by another scheduling component to be used instead of kube-scheduler 128. This feature enables at least some embodiments herein to be usable as a replacement scheduling functionality. In accordance with the embodiments herein, by modifying the kube-scheduler 128 to allow peer-to-peer functionality, the potential number of nodes available to perform a task is greatly increased. Essentially, by allowing each node to itself perform a similar type of scheduling function (and tracking of success rates and availability), it distributes the scheduling functionality over a set of nodes that is limited only by the ability of nodes to communicate with each other. For example, in certain embodiments, the modifications discussed herein in FIG. 1 (and as well in the flow charts of FIGS. 2-7) provide a solution to the problem of maximizing the probability of on-going successful behavior in a distributed system consisting of a network of interconnected assets (e.g., nodes similar to the worker nodes 104 in FIG. 1) which have no central control or supervision. Thus, at least some embodiments herein are able to create a computing infrastructure across all of the distributed, heterogeneous resources that exist in an enterprise.

In certain embodiments (e.g., those using Kubernetes) an approach is provided that changes the Kubernetes control plane architecture to be able to handle multiple concurrent schedulers (e.g., distributed state schedulers 160 of FIG. 1) trying to process jobs/applications being requested to be scheduled. In addition, in certain embodiments (e.g., those using Kubernetes), the Kubernetes environment is modified so that it can deal with a cluster 180 (grouping of nodes), where this change includes a Peer-to-Peer approach that considers the stability of the network. As will be appreciated, in certain embodiments, the described modifications to key components of the Kubernetes system are usable to enable any existing deployment to leverage new capabilities. For example, the success rate history table 162 (discussed further herein) modifies how the control-plane 102 understands the health of resources (e.g., nodes 104) by using a predictive algorithmic approach using "asset type" and connection is able to handle the dynamic nature of resources (e.g., whether a node is active and/or whether it has availability to perform a task) for processing being available.

In addition, the described modification of the existing Kubernetes scheduler to support the described distributed State Scheduler, as discussed herein for certain embodiments, enables a federated scheduling paradigm that does not exist today. In particular, in accordance with at least some embodiments herein, any application developed against the Kubernetes Open-Source API is able to integrate with zero changes allowing seamless integration into existing enterprises.

In addition, in certain embodiments, the solutions shown and described in connection with FIGS. 1-8 herein provide an arrangement that includes scheduling algorithm (e.g., as described below in FIGS. 2 and 3) for a distributed system with no central control. In certain embodiments, the solutions include two aspects: a metric (referred to herein as a "job speed up metric") to quantify success as a function of time and propose a method to maximize that metric, as discussed further below in connection with FIG. 7, and also a scheduling algorithm (FIGS. 2-4) that runs on each node of any type of a distributed system and attempts to optimize its performance by minimizing a cost function (FIG. 7) that measures and penalizes the amount of operation that did not succeed.

Figure 2:
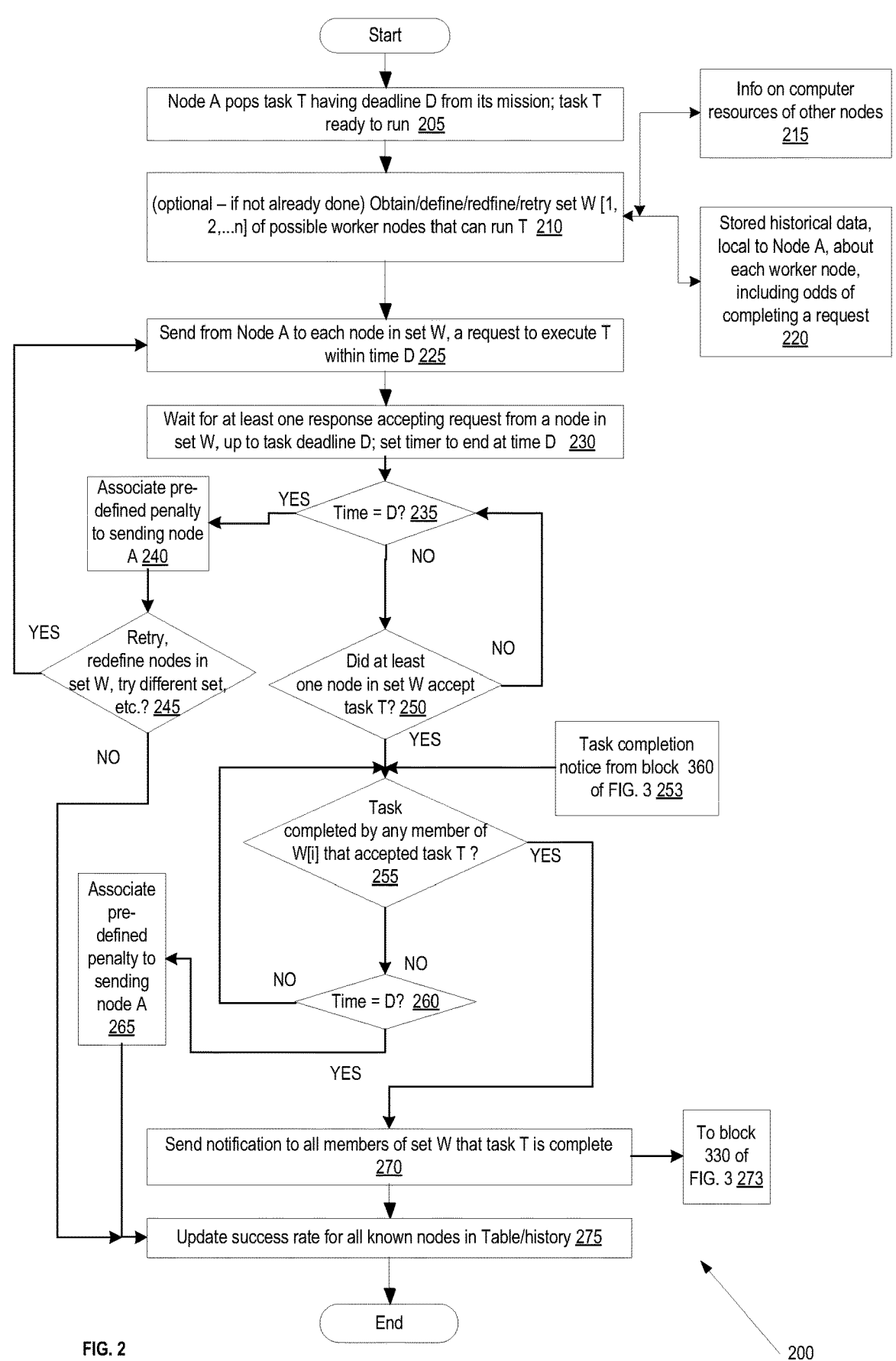
FIG. 2 is a flow chart of a peer-to-peer scheduling process, configured to run on the system of FIG. 1, from the perspective of a first node seeking another peer node to help it run a task, in accordance with one embodiment.
Figure 3:
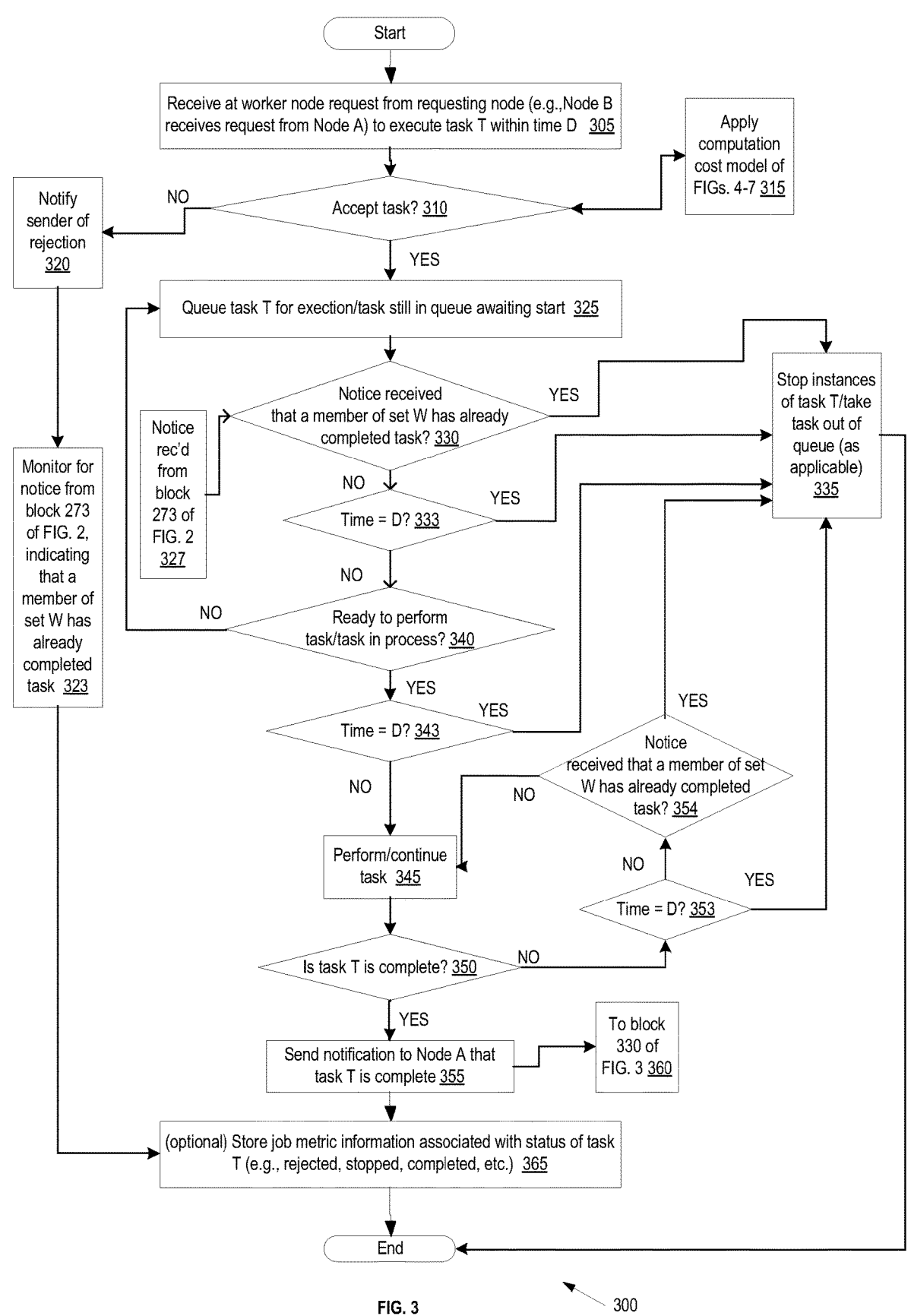
FIG. 3 is a flow chart of a peer-to-peer scheduling process, configured to run on the system of FIG. 1, from the perspective of a worker node being queried about running a task, in accordance with one embodiment.

FIG. 2 is a flow chart of an exemplary peer-to-peer scheduling process 200, configured to run on the system of FIG. 1, from the perspective of a first node seeking another peer node to help it run a task, in accordance with one embodiment. FIG. 3 is a flow chart 300 of a peer-to-peer scheduling process, configured to run on the system of FIG. 1, from the perspective of a worker node being queried about running a task, in accordance with one embodiment. Each of these is described below.

As a simplified example, FIGS. 2-3 could refer to a situation where node A 104a could be seeing if either of node B 104b or node C 104c, is available to execute a task, showing the actions at node A in FIG. 2 and node B 104b and/or node C 104c, in FIG. 3. Consider that, in a given system (e.g., a system not unlike the system 100, but without the modifications of the embodiments provided herein), each worker node 104 may be connected to some, possibly all, the other worker nodes 104. Each worker node 104 has the ability to perform computational tasks of various natures, and each worker node 104 has a "mission" to perform (where the "mission" corresponds to a sequence of tasks). Each mission (and/or task) must be started and completed within certain time constraints (e.g., a deadline D). A node's tasks $T_1, T_2 \ldots T_n$, can be executed locally or remotely by other worker nodes 104. The system is unstable as nodes 104 can join or disconnect at any time, and the connection bandwidth and latency can change arbitrarily. Nodes 104 have limited or zero visibility on other nodes' status and behavior. There is no centralized coordination of activities. Each node 104 determines its course of action based on local information and historical data about previous interaction with other nodes 104. The overall purpose of the system is to complete as many as possible of the tasks of within specified time and dependencies constraints.

Figure 4:
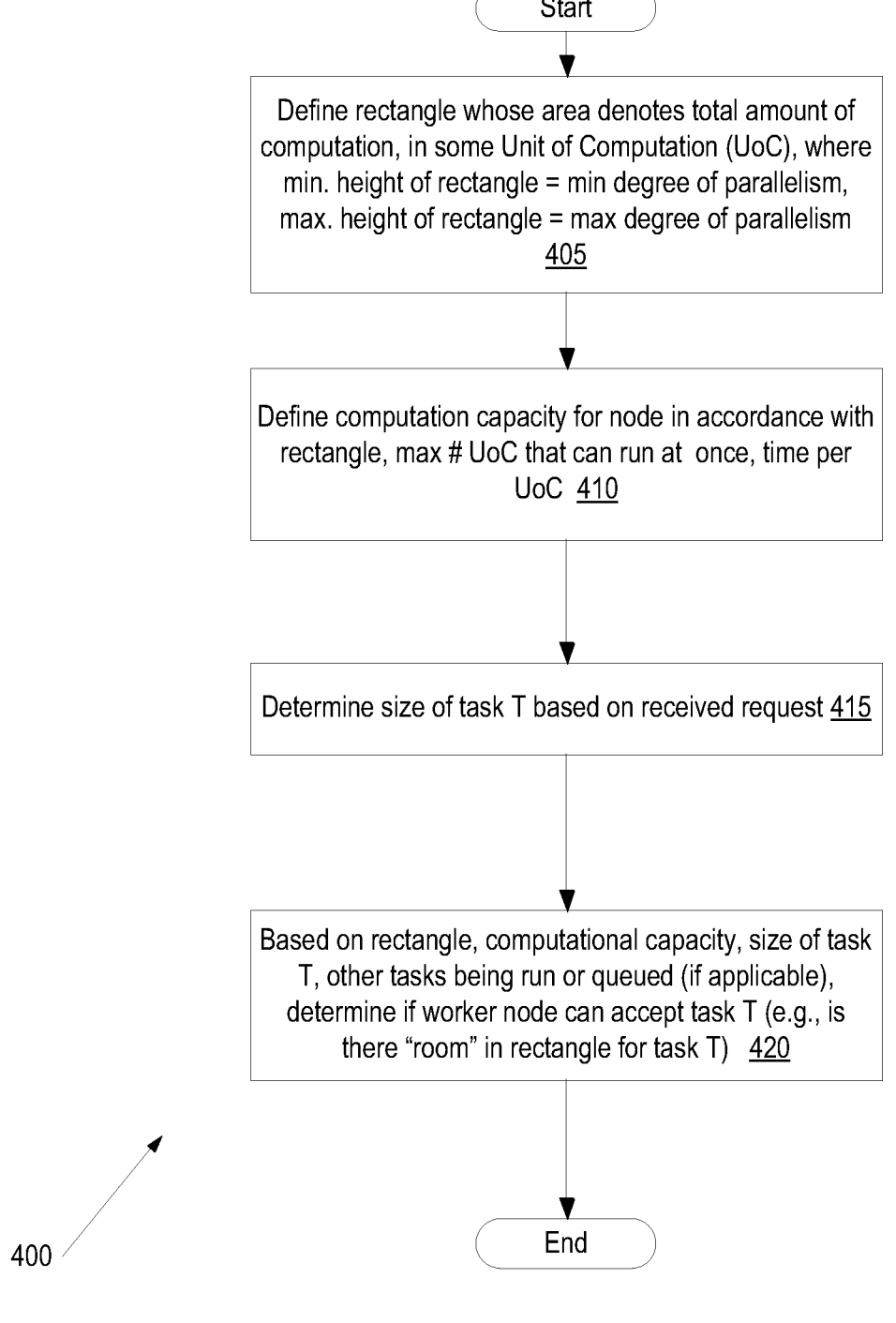
FIG. 4 is a flow chart of a computation cost model process usable in accordance with the system of FIG. 1 and the methods of FIGS. 2-3, in accordance with one embodiment.
Figures 5, 6:
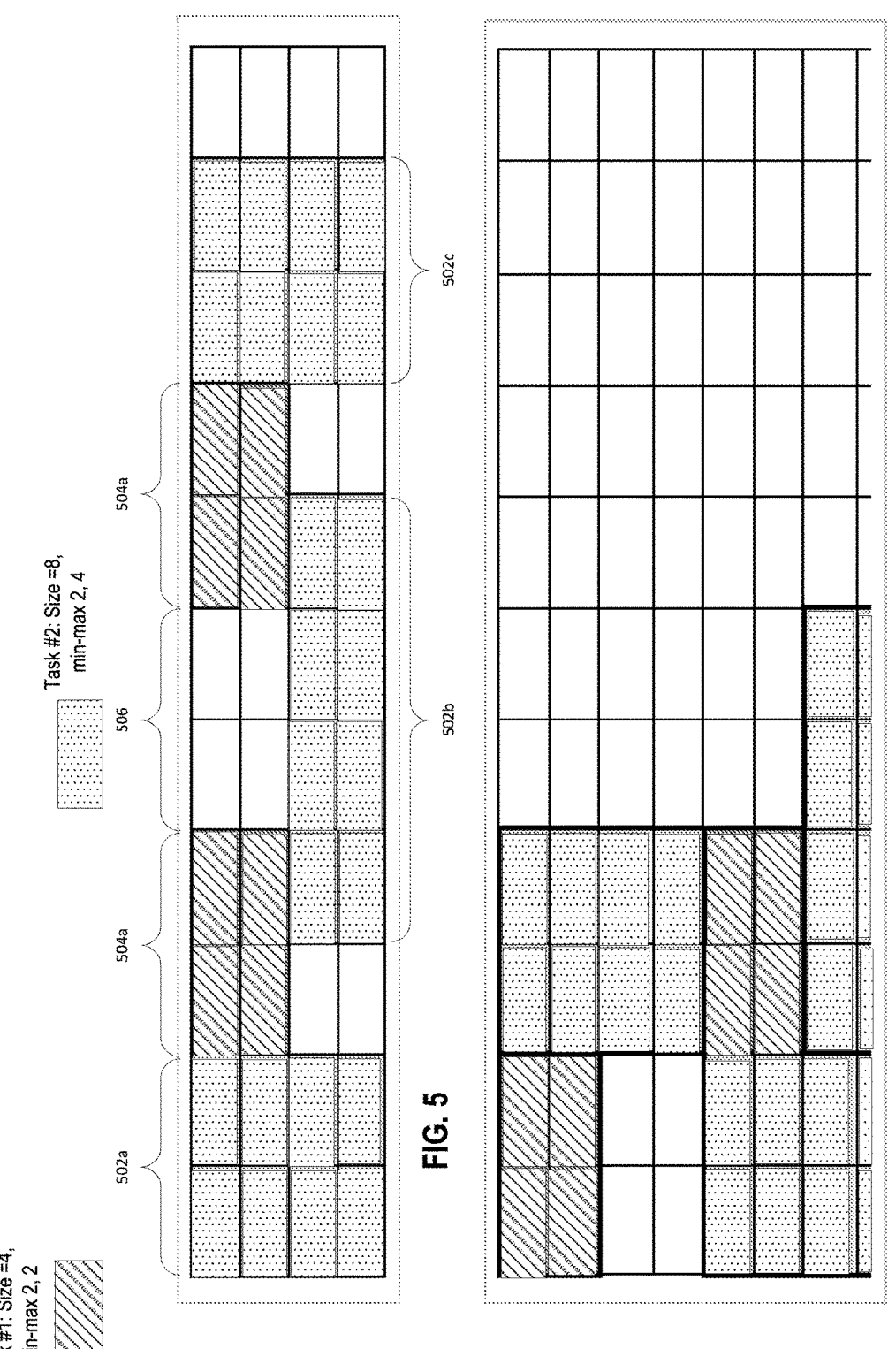
FIG. 5 is a first conceptual illustration of the computation cost model process of FIG. 4, comparing options for two tasks, in accordance with one embodiment.
FIG. 6 is a second conceptual illustration of the computation cost model process of FIG. 4, comparing options for two tasks, in accordance with one embodiment.

The scheduling processes described herein for the flowcharts of FIGS. 2-4 and 7 and in the illustrations of FIGS. 5-6, help to provides a way to perform scheduling in a distributed system with no central control. The scheduling process includes several advantageous aspects: a metric to quantify success as a function of time (FIG. 7) a method to maximize that metric (FIGS. 5-7); a scheduling algorithm that runs on each node of a distributed system (FIGS. 2, 3) and attempts to optimize its performance by minimizing a cost function (FIGS. 5-7) that measures and penalizes the amount of operation that did not succeed.

In certain embodiments, a core concept is that of a success score/success rate (e.g., as stored in a success rate table 162 as shown in FIG. 1) that each node 104 assigns to any other nodes 104 that it interacts with. For example, referring briefly to FIG. 1, as a first node A 104a requests execution of tasks from other nodes B 104b, and node C 104c, the first node A keeps track of the success rate from each of the other nodes 104b, 104c in a success rate table 162a that is updated at each interaction (e.g., each time the first node A 104a sends a request to other nodes 104). When a new task T needs to be executed, a requestor node 104 will compile a list of requests based on the historical success rates collected until then. The set of candidate nodes (to which the new task T can be sent) also can be expanded based on requests from other nodes that may contain information about other members of the network. For example, nodes may learn from other nodes about which particular nodes in a peer-to-peer group, are likely to have availability at certain times of the day, based on historical data and success rates. In another example, a node may learn from other nodes, that certain particular nodes in a peer-to-peer group, are more likely to have success with certain types of tasks or other requests (e.g., because of the resources available to that particular node). In certain embodiments, a simple metric to quantify the amount of computation need and capacity is introduced to model the complexity of a computational task as well as node's ability to satisfy it.

As a broad overview of the methods of FIGS. 2-4, four independent processes are taking place at each respective peer node 104:

Request process—issues requests to other peer nodes as tasks are popped from the first peer node's mission list;

Response process—handles messages from other nodes, including requests for task execution. If the respective peer node accepts a request for task execution from another node, the task is placed on an execution queue for the respective peer node that accepted the request;

Monitor process—maintains a list of tasks being run for it by other peer nodes and updates the penalty (at the respective peer node) if the task's deadline occurs before a success notification is received;

Execution process—Schedules locally the tasks in the execution queue while monitoring the local time. Note that this is different from the work of the monitoring process/thread that is concerned with tasks that have been assigned to other nodes.

Referring to FIG. 2, Initially, in block 205, a node that is going to send a request to other nodes (e.g., for purposes of this example, node A 104a of FIG. 1) pops a task T having a deadline D from its mission or set of tasks, where task T is a task that is ready to run. If not already done, the node 104 defines a set W [1, 2, . . . n] of possible worker nodes that can run the task T (block 210). Inputs to defining the set W can include, in certain embodiments, information about the computer resources of other nodes (block 215) as well as stored historical data, local to the node sending the request (e.g., node A) about each worker node, including odds of completing a request (block 220). In certain embodiments, the node 104 obtains, generates, or otherwise learns the parameters of the set W in advance of performing block 205. In a further embodiment, the node 104 can be dynamically updated regarding the set W (e.g., if the set W is expanded), e.g., via updates provided via blocks 215, 220.

At block 225, node A sends to each node in set W (e.g., each peer node), a request to execute a task T within time D. Node A then waits (block 230) for at least one response from a node in set W, where the requesting node A will wait to see if any nodes in set W accepted the request and also if the acceptance of the task (as well as the task itself) is done by the deadline. At block 235, a check is made to see if the time D has been reached. If yes, then, after a predefined penalty is assessed at node A (block 240) (explained further below), node A can determine (block 245) whether it wants to retry sending the request and/or to redefine the set of nodes W to whom the request was sent (e.g., in an attempt to find a node willing and able to execute task T, perhaps by expanding the size of W or including one or more different nodes in W). This determination at block 235 could be made, for example, based at least in part on the nature of the task T, or on a given node A first having policies that prioritize checking a first set $W_1$ of peer nodes and then if that fails going to a second subset $W_2$ of peer nodes, etc. The subsets can be defined using any criteria, including for example creating subsets based on historical success rates (explained further below).

Referring again to FIG. 2, the predefined penalty at block 240, in certain embodiments, helps to add a unique feature of penalty-based optimization, to this process of finding a node to run a task (the predefined penalty is also applied as a result of another set of actions/decisions, at block 265, referenced further herein, and this explanation is applicable to that block, as well). The main assumption behind the pre-defined penalty (i.e., a penalty-based metric) is that tasks from the various missions must be started and completed at a specific time and/or completed within a specified interval. Every time a node fails to do so, it counts as a penalty incurred by the node whose mission owned that task. So, in the example of FIG. 2, if node A, which is seeking a node to perform the task T, fails to get any node to respond on time (answer at block 235 is NO) or, if at least one node accepts, fails to get a notice of completed tasks on time (answer at block 260 is NO), then that requesting node A incurs a penalty. In addition, in certain embodiments, if a given node is "dead" or unreachable, the requesting node will not get a response from that dead/unreachable node.

In accordance with at least some embodiments, there is no inherent cost in running the same task redundantly on more than one node. The penalty accrued by a node may decay over time or based on other circumstance. Optimization against this metric, in certain embodiments, consists in keeping the overall penalty of the system (the sum of all penalties for the nodes) as low as possible over time. In certain embodiments, the penalty methodologies described herein effectively disregard any inherent cost incurred in doing something and focus on the cost of failing at something. Thus, in certain embodiments, an approach is provided in which all available resources can be thrown at the solution liberally in order to maximize the probability of success, but low probability of success is penalized.

In some embodiments, a Penalty-based Cost Function (e.g., as applied in blocks 240 and 265 of FIG. 2) is determined based on an expected outcome of a job execution. In particular, the expected penalty $EP_j$ associated to failing to complete a job j by a node expresses the likelihood that a penalty is incurred if the node attempts to run job j, and is defined as shown in Equation 1:

$$EP_j = V_j(1 - |C_j|) \tag{1}$$

where $V_j$ is the job value, and $|C_j|$ is the probability that the job j will be completed in time. If the job is attempted on a group of peer nodes denoted by indices k=1, 2, . . . n, each of which has a different rate of success for j denoted by $|C_{jk}|$ the expected penalty is given by Equation 2:

$$EP_j = V_j \cdot \left(1 - \left|\bigcup_{k=1}^{n} C_{jk}\right|\right) \tag{2}$$

$$EP_j = V_j \cdot \left(1 - \left|\bigcup_{k=1}^{n} C_{jk}\right|\right)$$

The probability of success $C_{jk}$ is computed by a client node based on its historical record of interacting with node k.

$$C = FN(K, n) \cdot \sum_{i=n}^{0} (t_i - t_{i-1}) \cdot \left(\min(w_i y_i, w_0 y_0) + \text{abs}(w_i y_i - w_{i-1} y_{i-1})/2\right)$$

Another related factor in the penalty based cost function is a worker success rate. The current success rate, or probability of success, for a worker node peer can be computed as the finite approximation of the definite integral of an exponential decay function over n results, as shown in Equation (3):

$$\tag{3}$$

$$C = FN(K, n) \cdot \sum_{i=n}^{0} (t_i - t_{i-1}) \cdot \left(\min(w_i y_i, w_0 y_0) + \text{abs}(w_i y_i - w_{i-1} y_{i-1})/2\right)$$

$$C = FN(K, n) \cdot \sum_{i=n}^{0} (t_i - t_{i-1}) \cdot \left(\min(w_i y_i, w_0 y_0) + \text{abs}(w_i y_i - w_{i-1} y_{i-1})/2\right)$$

$$C = FN(K, n) \cdot \sum_{i=n}^{0} (t_i - t_{i-1}) \cdot \left(\min(w_i y_i, w_0 y_0) + \text{abs}(w_i y_i - w_{i-1} y_{i-1})/2\right)$$

$$C = FN(K, n) \cdot \sum_{i=n}^{0} (t_i - t_{i-1}) \cdot \left(\min(w_i y_i, w_0 y_0) + \text{abs}(w_i y_i - w_{i-1} y_{i-1})/2\right)$$

where i=n is the most recent result and n=0 the oldest, $t_i$ is the time the i-th request was sent, $y_i$ is the outcome of the i-th request (a Boolean encoded as 0 or 1), and wi is the value of the decay function at time $t_i$. The factors $w_i$ denote a function $w(t_i)$ of the form $K^{-\Delta t}$ where K is a constant that determines the speed of the decay and $\Delta t$ is the time distance from the most recent result, and FN is a normalization function such that C will converge to 1 for n→∞ and for $(t_i - t(t_{i-1})) \to 0$ when all $y_i$ are 1. In practice, the value of FN can be computed numerically by replacing all the $y_i$ terms in the summation above (in equation (3)) with 1. The meaning is that, if all latest n requests succeed, function C will evaluate to a number close to 1 which indicates perfect success rate.

Referring again to FIG. 2, after associating the above-described penalty at block 240, if the answer at block 245 is "YES" (to retry, redefine, try different set, etc.), then processing moves back to block 210 to select a different set of nodes W or to retry existing set of nodes W, etc. If the answer at block 245 is NO, then that means that no node receiving the request, accepted it within the time D, and the requesting node (Node A) is not choosing to retry. Processing then moves to block 275 to update the success rate for all known nodes, in the success rate history/table (FIG. 2).

Referring back to block 235, if the time has not yet expired (answer at block 235 is YES), the process can keep waiting to see if at least one node in set W accepts task T (block 250), so long as the time D has not been reached. Thus if the answer at block 235 is YES and the answer at block 250 is NO, waiting continues. If at block 250, the answer is YES, that means at least one node in set W accepted the task. It is possible, as well, that more than one node accepts the task and that a certain node might finish before others. Waiting begins (block 255) to see if the requesting node will receive a notice of task completion (from any node that accepted the task T) (block 253, from block 360 of FIG. 3, discussed further herein). If the answer at block 255 is NO (task T not yet completed) and the time limit D has not been reached (answer at bloc, 260 is NO), then and waiting can continue so long as the time limit D is not reached (block 260).

If the time limit D is reached with no notice of task completion (answer at block 260 is YES), then processing moves assess a predefined penalty to the node sending the request (block 265), where this pre-defined penalty is similar to that discussed above in connection with block 240). If the task is completed by any member of the set W who has accepted the task (answer at block 255 is YES), then the requesting node sends a notification to all members of the set W that the task T is complete (block 270). This notification sent to all members of set W is sent to all set members even if the set member has not accepted the task and is routed to blocks 330 (for nodes that accepted task T) and blocks 323 (for nodes that rejected task T) of FIG. 3 (discussed further herein). This means that other nodes in W, even if they accepted the task T and have started it, stop their instance of running the task T (this is also discussed below in connection with FIG. 2). This also means that the nodes in W, even if they rejected task T, are provided information about which other nodes accepted and/or successfully completed task T. Providing information to all nodes about task completion and accepting tasks, in certain embodiments, is information that nodes in the peer-to-peer network can make use of in future, to improve odds of task completion success and task completion speed, should they become requesting nodes.

The cycle for task T ends when one of several things happen: there is successful completion of the task T by the deadline D (which means that processing reached block 255 with an answer of YES at that block, e.g., by receiving a notice (block 253) of successful task completion) or there is failure that leads to penalties as defined in blocks 240 and 265, such as can occur if the task T is not completed by deadline D (answer at block 260 is YES), or if no node accepts the task T by the deadline D (answer at block 235 is YES). Once the T cycle is complete (with success or penalty) the requesting node (e.g., node A) updates the values for all nodes in set W[1, 2, . . . , n] in a success rate table 162 (FIG. 1) that records the success rate of each node in the system of which A has knowledge (block 275).

As explained above, FIG. 2 is a flow chart describing a peer-to-peer scheduling process, configured to run on the system of FIG. 1, from the perspective the requesting node. In contrast, FIG. 3 is a flow chart 300 of a peer-to-peer scheduling process, configured to run on the system of FIG. 1, from the perspective of a worker node 104 being queried about running a task, in accordance with one embodiment. In block 305, the worker node receives the request from the requesting node (e.g., node B 104*b* of FIG. 1, receives a request from node A 104*a* of FIG. 1) to execute task T within time D. In block 310, the receiving node makes a decision whether or not to accept the task T. As part of the decision, in certain embodiments, the receiving node can apply a computation cost model, as described and discussed further herein in FIGS. 4-7 (block 315).

If the answer at block 310 is NO (task not accepted, task rejected), the receiving node notifies the sending node that it has rejected the task (block 320). As noted above in connection with block 270 of FIG. 2, even if the node receiving the task T does not accept it, it may still receive notifications from block 273 of FIG. 2, that another node has completed the task (block 323) and information on the rejection of this task is, optionally, stored (block 365). In addition, although not specifically listed in FIG. 3, those of skill in the art will appreciate that in some embodiments, all nodes also could be notified about other information associated with task T, such as that no node has accepted task T, no node completed task T within time frame D, etc.

Referring again to block 310 of FIG. 3, the answer at block 310 is YES (task is accepted), then the receiving node puts the task T in a queue for execution (block 325). At any point after accepting the task, the receiving node could receive a notification (block 327) from the requesting node, that another node has completed the task (e.g., in accordance with block 270 of FIG. 2). If such a notice is received, that a member of set W has already completed task T (block 330), then the receiving node stops its instance(s) of task T and/or takes task T out of its queue (e.g., if not yet started), as applicable (block 335). Processing then moves to block 365, where job metric information associated with task T, such as if the task was stopped, completed, which node completed it, etc., is stored, e.g., in success rate history table 162 (FIG. 1).

If the answer at block 330 is NO, the receiving node keeps the task in its queue (block 340), waiting so long as the answer is NO, and so long as time does not expire (e.g., answer at block 333 is NO) and so long as it has not received notice that another node has completed the task (answer at block 330 continues to be NO), until the answer at block 340 is YES, which means that the receiving node is ready to perform the task. If time has not expired (answer at block 343 is NO), then the receiving node can start the task (block 345) and/or continue the task (if applicable). Because the receiving node is aware of the time it needs to complete the request received in block 305, in certain embodiments, the receiving node regularly and/or periodically checks whether the time has expired (e.g., as noted in FIG. 3 in blocks 333, 343, 353), even after it has started performing the task, as noted below.

If time to complete the task expires (i.e., Time=D) while the task is accepted and in the queue, but not yet started (e.g., answer at block 333 is YES), then the receiving node takes the task out of its queue (block 335) and processing ends. If time expires when the node is ready to perform the task (answer at block 343 is YES), then processing similarly flows to block 325 to remove the task from the queue. If time to complete the task expires during task execution, but before task is complete (e.g., answer at block 353 is YES), then processing similarly flows to block 335 to remove the task from the queue.

Similarly, as will be appreciated, at any time while the receiving node is waiting to be ready to perform the task, or even while performing the task, independent of whether or not the time for completing the task has expired, the receiving node may receive notice that another node has completed the task first, as described above (e.g., as checked in block 330, before performing the task and block 354, while performing the task). If the receiving node is notified that another node has completed the task first (e.g., answer at block 330 is YES or answer at block 354 yes YES), then processing proceeds to block 335 to remove the task from the queue or stop instances of the task from running, as applicable.

If the receiving node has not been notified that the task T has been completed (answer at block 330 is NO), and time has not yet expired (answer at block 343 is NO), and the receiving node is ready to perform the task (answer at block 340 is YES), then the receiving node starts performing the task (block 345). Note that, if time has not expired and no other nodes have completed the task, but the receiving node is still not ready to begin it (answer at block 340 is NO), processing moves back to block 325 to await start. While the receiving node is performing the task (blocks 325-350, "in process"), checks are made until the task is complete (block 350 answer is YES), as noted above, to see if time has expired (block 353) and/or to see if notice is received that another node has completed the task (block 354). As noted above, if another node finishes first, the receiving node stops the task (block 335). Else, the receiving node continues with the task either until another node finishes it first, until time expires, or until the receiving node completes the task (answer at block 350 is YES). When the receiving node finishes the task, it notifies the sending node that the task T is complete (block 355) via a notification (block 360). Optionally, in certain embodiments, after the either success-ful completion of the task, rejecting the task, or otherwise ending processing relating to the task, job metric informa-tion can be stored (block 365) at the receiving node.

As noted above, in determining whether or not to accept a task, a receiving node applies a computation cost model process (block 315). FIG. 4 is a flow chart of a computation cost model process 400 usable in accordance with the system of FIG. 1 and the methods of FIGS. 2-3, in accor-dance with one embodiment. This computation cost model is merely one type that is usable with the methods of FIGS. 2-3 herein, and other types of cost models may be usable. In certain embodiments, the decision at a receiving node, to accept or reject a request to perform a task (e.g., block 310 of FIG. 3) depends on the receiving node capacity in relation to the task size. To simplify and quantify this, in certain embodiments, it is possible to model computation as a shape—essentially a rectangle (block 405 of FIG. 4) whose area denotes the total amount of computation (measured in terms of some arbitrary atomic unit of computation or UoC), and the minimum and maximum height of the rectangle denote the minimum and maximum degree of parallelism (to what degree a task can be run as a set of independent pipelines). In addition, the computation capacity of a node, in certain embodiments, can be is defined (block 410) by a computational bandwidth (maximum number of UoC that can run at the same time) and speed (time to execute one UoC).

Once a node determines the size of a task T (e.g., based on the received request) (block 415), the node can make a determination (block 420) about whether or not it can accept the task, where the determination takes into account things like the size of the task, the node's own computation capacity, other tasks being run or in the queue (if applicable), etc. In certain embodiments, a way to visualize and accom-plish this determination, is for a node to maximize the use of its resources by reshaping the tasks in its queue to minimize unused resources.

Consider FIG. 5, which is a first conceptual illustration of the computation cost model process of FIG. 4, comparing options for two tasks, in accordance with one embodiment. In FIG. 5, task #1 represents a first type of task and is indicated by blocks with diagonal shading, and task #2 represents a second type of task and is indicated with dotted shading. Assume, in FIG. 5, that a node is trying to maxi-mize its resource usage by trying to squeeze in as many possible tasks into its task space, where for purposes of this example, the task space corresponds to the entire grid of 44 blocks (4 blocks heigh by 11 blocks wide) as shown in FIG. 5.

For purposes of this example, task #1 is a type that has a size of 4 blocks total, with minimum dimensions of 2×2, meaning that in terms of a predefined unit of computation (UoC) (whatever that computation may be), the minimum height of 2 blocks corresponds to a minimum degree of parallelism needed for task #1. Similarly, for purposes of this example, task #2 is a type that has a size of 8 blocks total, with minimum dimensions of 2×4, meaning that in terms of a predefined unit of computation (UoC) (whatever that computation may be), the minimum height of 2 blocks corresponds to a minimum degree of parallelism needed for task #2 and the maximum height of 4 blocks corresponds to a maximum degree of parallelism needed for task #4.

In FIG. 5, a given node, in certain embodiments, intui-tively reshapes the task rectangles for task #1 and task #2 to fit as many as possible in its total queue of 44 blocks. For example, in FIG. 5, there are three instances of task #2 (502*a*, 502*b*, 502*c*) that can fit into the queue of the node having that queue and capacity. It can be seen that the instances 502*a* and 502*c* of task #2 use the maximum degree of parallelism of 4 (height of 4 blocks), whereas the instance 502*b* of task #2 uses the minimum degree of parallelism of 2 (height of 2 blocks). For task #1, there are two instances 504*a*, 504*b*, each having the minimum height of 2 blocks. The example of FIG. 5 also shows an example of unused capacity 506 which could, if desired, be configured to hold another instance of task #1, since it has the correct size.

FIG. 6 is a second conceptual illustration of the compu-tation cost model process of FIG. 4, comparing options for two tasks, in accordance with one embodiment, and shows additional ways that instances of two tasks with size 4 and 8 can fit into a node's queue. As can be seen, FIG. 6 depicts a node with higher capacity and thus fits the same tasks differently.

In another aspect, referring back to FIG. 1, at least some embodiments herein provide a job speed up metric 164. As noted elsewhere herein, networked systems of heterogenous computing nodes are becoming increasingly commonplace in a variety of domains. Servicing computation tasks in such systems is extremely difficult because of their heterogeneity and instability. As noted above, networked systems of het-erogenous computing nodes are becoming increasingly commonplace in a variety of domains. Servicing computa-tion tasks in such systems is extremely difficult because of their heterogeneity and instability. Such systems may include a variety of computation platforms (CPUs, GPUs, FPGAs) and varying capabilities. Communication channels can be unstable in some networked systems. Nodes can leave and join the network abruptly. Additionally, tasks can be different in their nature and requirements.

There is no current metric that can evaluate performance of such networks. Metrics usually used for performance estimation of homogeneous computing networks (clusters) like "Average CPU use" cannot correctly estimate perfor-mance of heterogenous computing networks because they assume that the resources (nodes) are homogeneous and have common features. Incorrect metrics or biased metrics can slow optimization or even instigate incorrect results. Thus, in accordance with at least some embodiments herein, a "Job speed-up metric" is proposed, where the job speed-up metric helps correctly estimate the heterogeneous network's ability to run heterogeneous jobs optimally.

To understand the Job speed-up metric, consider an exem-plary computing node network, such as that shown in FIG. 1. The exemplary computer node network consists of het-erogeneous devices (nodes) connected by communication channels of different types. The nodes have different calcu-lation resources that they can provide (CPUs, GPUs, FPGAs, ASICs, etc.). Some nodes are capable of providing a few types of resources, where the resources have different capabilities and metrices for their measurement. Similarly, jobs and tasks these computing nodes execute may require different resources and metrices. In accordance with certain embodiments herein, to evaluate performance of such com-puter network, it is helpful to have a universal performance metric. Such a universal metric also is necessary for network optimization routines. In accordance with certain embodiments herein, a job speed-up metric is provided. The Job speed-up metric estimates improvement/decline of job performance on a computing node network compared to a specified job performance.

The Job speed-up metric, in certain embodiments, is computed as the ratio of the time $T_n$ that a job executed on the network to the time $T_j$ that the job was specified to execute. In accordance with one embodiment, $T_j$ is configured to be adjusted to a common resource speed for all tasks. An averaged ratio of $T_j/T_n$ (where $T_n$ is the actual time taken, as explained further below) results in a metric that can evaluate how our network can speed-up or slow-down the job execution.

Figure 7:
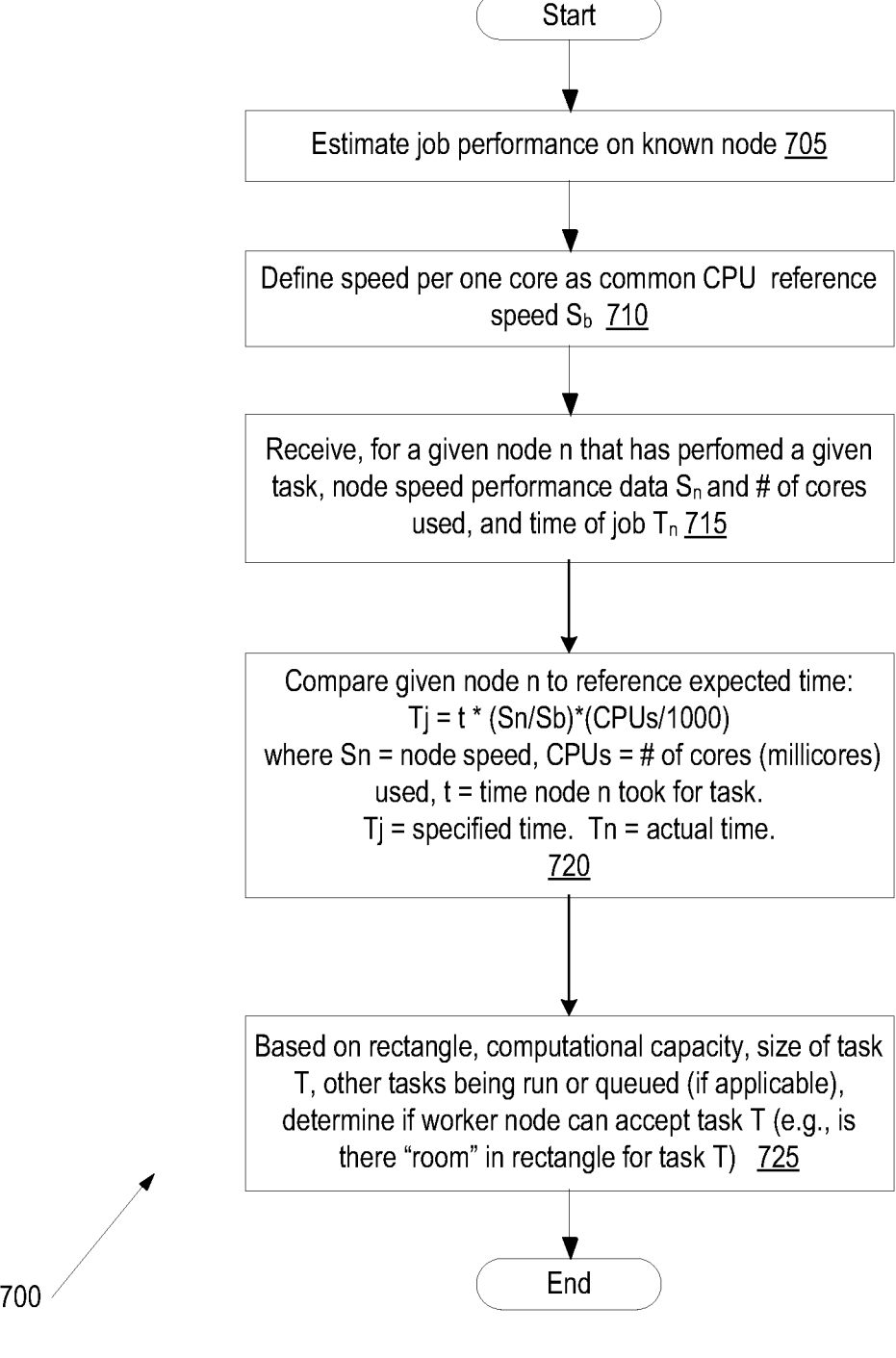
FIG. 7 is a flow chart of a job speed up metric usable in accordance with the system of FIG. 1 and the methods of FIGS. 2-4, in accordance with one embodiment.

FIG. 7 is a flow chart of a job speed up metric usable in accordance with the system of FIG. 1 and the methods of FIGS. 2-4, in accordance with one embodiment. A simple way to calculate $T_j$ is to estimate a job performance on a known node (block 805). As part of this, a reference speed $S_b$ is defined per one core as a common CPU reference speed (block 710). For example, assume that an exemplary common unit CPU performs $S_b$=5 GFLOPs (Giga-one billion Floating Point Operations) per one core. This reference value of $S_b$ can be used during evaluations of tasks done by other nodes.

$$T_j = t * \frac{S_n}{S_b} * \frac{CPUs}{1000}$$

As a further step in determining the job speed-up metric, to perform the computation, information is received (block 715) about a given node n that has performed a given task, where the information includes information enabling computation of $S_n$ and also the number of cores used (CPUs) and the time the job took $T_n$. For example, an exemplary set of information could include that a job worked for t=1.5 seconds on a given node having an Intel i7 CPU that is capable of a speed of $S_n$=6 GFLOPs, and the and CPU request for the job was CPUs=100 m (millicores). Then the specified calculation time (on one core of the common unit CPU) can be calculated (block 720) using equation (4):

$$T_j = t * \frac{S_n}{S_b} * \frac{CPUs}{1000} \qquad (4)$$

$$T_j = t * \frac{S_n}{S_b} * \frac{CPUs}{1000}$$

$$T_j = t * \frac{S_n}{S_b} * \frac{CPUs}{1000}$$

$$T_j = 1.5 \text{ sec} * \left( \frac{\frac{6GFLOPS}{core}}{\frac{5GFLOPS}{core}} \right) * \left( \frac{100 \text{ millicores}}{1000} \right) = 0.18 \text{ sec}$$

Plugging in the exemplary set of information in equation (5):

$$T_j = 1.5 \text{ sec} * \left( \frac{\frac{6GFLOPS}{core}}{\frac{5GFLOPS}{core}} \right) * \left( \frac{100 \text{ millicores}}{1000} \right) = 0.18 \text{ sec} \qquad (5)$$

-continued $$T_j = 1.5 \text{ sec} * \left( \frac{\frac{6GFLOPS}{core}}{\frac{5GFLOPS}{core}} \right) * \left( \frac{100 \text{ millicores}}{1000} \right) = 0.18 \text{ sec}$$

$$J_{su} = \frac{T_j}{T_n} = \frac{0.18}{0.15} = 1.2 T_n = t * \frac{CPUs}{1000} = 0.15 \text{ sec}$$

Then the Job speed-up metric ($J_{su}$) for the same node can be calculated as shown in equation (6):

$$J_{su} = \frac{T_j}{T_n} = \frac{0.18}{0.15} = 1.2 T_n = t * \frac{CPUs}{1000} = 0.15 \text{ sec}$$

where (6)

The job speed-up metric ($J_{su}$), in certain embodiments, is part of a computation that can help a node determine if it will accept a task. For example, in block 725, based on the rectangle (FIGS. 5-6), computational capacity, size of task T, other tasks being run or queued (if applicable), a determination can be made as to whether a worker node can accept task a given task T (e.g., is there "room" in rectangle for task T), including in view of the job speed-up metric.

The job speed-up metric ($J_{su}$) is universal for evaluation of heterogeneous node performance. Independent of the calculating resources that a task uses because it is calculated using the execution time $T_j$ of the task on a common unit of particular type. The job speed-up metric $J_{su}$ takes into account the rate of performance improvement on the node to which the job was deployed. The job speed-up metric also is independent of task specifics because it doesn't include the job execution time, just the ratio. The job speed-up metric can be compared or averaged for different node types to estimate the network performance because it is unitless (it is a ratio). Thus, using the job speed-up metric as described herein, even different networks can be compared for performance of the same task types.

The job speed-up metric, in accordance with certain embodiments, has advantages over other known approaches. For example, metrics usually used for cluster performance estimation cannot correctly estimate performance of heterogenous computing networks because they assume that the resources (nodes) are homogeneous and have common features. Still other metrics measure task performance in millicores, or in percent of a cluster used. The job speed-up metric, in accordance with certain embodiments, provides an advantageous, resource-independent metric for network optimization algorithms.

Those of skill in the art will appreciate that the embodiments herein have applicability in varied areas. Examples of entities that can use one or more of the embodiments herein include, but are not limited to:

Hybrid cloud system providers;

Enterprises looking to leverage spare capacity in an information technology (IT) infrastructure to meet business demands;

Customer wanting to leverage resources available to aid in processing to further increase mission awareness;

Factories to manage and schedule distributed IoT sensors;

Any organization managing containers with Kubernetes;

Entities such as military forces around the world, as well as commercial entities that deploy network of interconnected and independent assets such as ships, trucks, airplanes, etc.;

Entities that run static but potentially disconnected facilities such as manufacturing;

Projects based on the citizen science paradigm such as Folding@Home, SETI@Home, and Universe@Home;

Distributed tactical systems deployed in a noisy, contested environment;

Distributed global systems of commercial assets (fleets, etc.);

Entities such as military forces use heterogenous computing networks; and

Projects based on the citizen science paradigm such as Folding@Home, SETI@Home, and Universe@Home.

Figure 8:
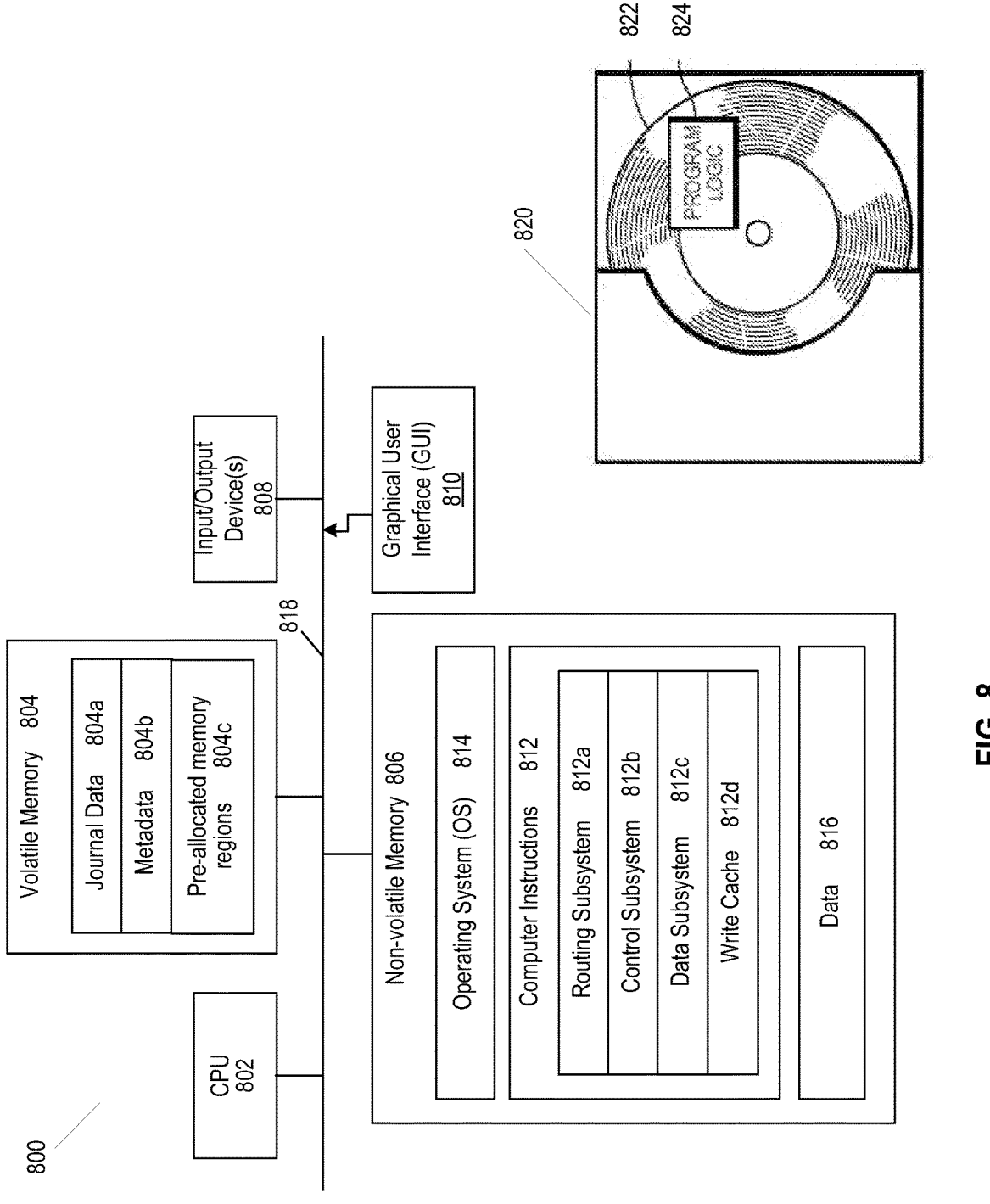
FIG. 8 is a block diagram of an exemplary computer system usable with at least some of the systems and methods of FIGS. 1-7, in accordance with one embodiment.

FIG. 8 is a block diagram of an exemplary computer system 800 usable with at least some of the systems and apparatuses of FIGS. 1-7, in accordance with one embodiment. Reference is made briefly to FIG. 8, which shows a block diagram of a computer system 800 usable with at least some embodiments. The computer system 800 also can be used to implement all or part of any of the methods, equations, and/or calculations described herein.

As shown in FIG. 8, computer system 800 may include processor/central processing unit (CPU) 802, volatile memory 804 (e.g., RAM), non-volatile memory 806 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 810 (e.g., a touchscreen, a display, and so forth) and input and/or output (I/O) device 808 (e.g., a mouse, a keyboard, etc.). Non-volatile memory 806 stores, e.g., journal data 804*a*, metadata 804*b*, and pre-allocated memory regions 804*c*. The non-volatile memory, 806 can include, in some embodiments, an operating system 814, and computer instructions 812, and data 816. In certain embodiment, the non-volatile memory 806 is configured to be a memory storing instructions that are executed by a processor, such as processor/CPU 802. In certain embodiments, the computer instructions 812 are configured to provide several subsystems, including a routing subsystem 812A, a control subsystem 812*b*, a data subsystem 812*c*, and a write cache 812*d*. In certain embodiments, the computer instructions 812 are executed by the processor/CPU 802 out of volatile memory 804 to implement and/or perform at least a portion of the systems and/or processes shown in FIGS. 1-7. Program code also may be applied to data entered using an input device or GUI 88 or received from I/O device 808.

The systems, architectures, and processes of FIGS. 1-8 are not limited to use with the hardware and software described and illustrated herein and may find applicability in any computing or processing environment and with any type of machine or set of machines that may be capable of running a computer program and/or of implementing a radar system (including, in some embodiments, software defined radar). The processes described herein may be implemented in hardware, software, or a combination of the two. The logic for carrying out the methods discussed herein may be embodied as part of the system described in FIG. 8. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor/CPU 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 10, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 8 shows Program Logic 824 embodied on a computer-readable medium 820 as shown, and wherein the Logic is encoded in computer-executable code thereby forms a Computer Program Product 822. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, terms such as "message" and "signal" may refer to one or more currents, one or more voltages, and/or or a data signal. Within the drawings, like or related elements have like or related alpha, numeric or alphanumeric designators. Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the disclosure herein must comprise more than one of that element, nor is it intended by illustrating a single element that the any disclosure herein is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. A method of distributing scheduling of a task within a plurality of nodes of a distributed computing system having no central scheduler controller, the method comprising:

(a) providing a plurality of interconnected nodes, each respective interconnected node comprising a distributed state scheduler and accessing its own respective node database storing performance data comprising historical success rates about other nodes in the plurality of nodes based on prior task execution requests, (b) determining, at a first node in the plurality of interconnected nodes, a first task to be run for the first node by a predetermined time deadline, wherein the first task is configured to be run by a node other than the first node;

(c) selecting, based on a penalty-based cost function, a first set of worker nodes from the plurality of interconnected nodes, wherein the first node selects each respective worker node in the first set based on respective performance data that the first node accesses about the respective worker node, the performance data including a probability of successful completion calculated from the historical success rates;

(d) sending, from the first node to each node in the first set of worker nodes, a request to execute the first task;

(e) communicating, if the first node receives an indication that execution of the first task was completed by a second node in the first set before the predetermined time deadline, a notification to the first set of worker nodes that the first task is complete;

(f) stopping, by worker nodes that have started executing the first task, their instances of the first task responsive to receiving the notification;

(g) associating, based on the penalty-based cost function, a first penalty at the first node, if the first node does not receive an indication that execution of the first task was completed before the predetermined time deadline, the penalty-based cost function is determined as EPj=Vj (1−|Cj|), where Vj is a job value and |Cj| is a probability that the first task j will be completed in time; and (h) updating performance data for each worker node in the first set of worker nodes, the updating indicative of whether or not the respective worker node succeeded in executing the first task by the predetermined time deadline, the updating modifies the probability of successful completion used in subsequent worker node selections.

2. The method of claim 1, further comprising:

(i) selecting a second set of worker nodes from the plurality of interconnected nodes, wherein the first node selects each respective worker node in the first set so that the second set of worker nodes comprises at least one worker node that was not in the first set; and (i) repeating (d) through (h) using the second set of worker nodes.

3. The method of claim 1, wherein the first node is configured to run a mission comprising a plurality of tasks and is further configured to repeat (b) through (e) for each of the plurality of tasks.

4. The method of claim 1, further comprising: (i) updating performance data, accessed by the first node, for each respective worker node in the first set of worker nodes, the updating indicative of whether or not any one or more of the respective worker nodes have spare computing resources.

5. The method of claim 1 further comprising: (i) configuring each respective worker node in the first set that received a notification that the first task is complete, to stop any instances of the first task running at that node.

6. The method of claim 1, wherein the method is implemented within a Kubernetes system.

7. The method of claim 1, wherein the performance data comprises data specifying computing resource capability information for each of the other respective nodes in the plurality of interconnected nodes.

8. The method of claim 1, wherein the performance data comprises data specifying, for each of the other respective nodes in the plurality of interconnected nodes, a set of historical data about each other respective node's responses to at least one past task execution request from the respective interconnected node that accesses the node database.

9. The method of claim 1, wherein the penalty-based cost function EPj expresses a likelihood that a penalty is incurred if the first node attempts to run the first task, and wherein when the first task is attempted on a group of peer nodes denoted by indices k=1, 2, . . . n, each having a different rate of success for the first task denoted by |Cjk|, an expected penalty is given by:

$$EPj = Vj \cdot \left(1 - \left|\bigcup_{k=1}^{n} Cjk\right|\right)$$

where the probability of success Cjk is computed by the first node based on its historical record of interacting with node k.

10. The method of claim 1, wherein updating performance data comprises calculating a current success rate C for a worker node as a finite approximation of a definite integral of an exponential decay function over n results, according to:

$$C = FN(K, n) \cdot \sum_{i=1}^{n} (t_i - t_{i-1}) \cdot \left(\min(w_i y_i, w_0 y_0) + \text{abs}(w_i y_i - w_{i-1} y_{i-1})/2\right)$$

where i=n is a most recent result, $t_i$ is a time an i-th request was sent, $y_i$ is an outcome of the i-th request encoded as 0 or 1, $w_i$ is a value of a decay function at time $t_i$, and FN is a normalization function.

11. The method of claim 1, wherein selecting the first set of worker nodes comprises:

defining a computation space for each candidate worker node having an area that denotes a total computation capacity of the candidate worker node, wherein dimensions of the computation space are measured in units of computation (UoC);

defining the first task in terms of a total first UoC that the first task requires, wherein the first task is representable as a first shape having dimensions corresponding to a minimum degree of parallelism and a maximum degree of parallelism; and determining whether the candidate worker node can run the first task based on whether the first shape fits entirely within the area of the computation space of the candidate worker node.

12. The method of claim 1, further comprising:

calculating a job speed-up metric (Jsu) to estimate performance of the distributed computing system, wherein:

a reference speed per core (Sb) is defined for a known node;

performance data is received for the second node comprising: a speed Sn of a CPU at the second node, a number of processing cores (CPUs) used to perform the first task, and a total actual time Tn a second node took to perform the first task;

an expected time Tj is determined that the second node was expected to perform the first task based on: Tj=t* (Sn/Sb)*(CPUs/1000); and the job speed-up metric is determined as: Jsu=Tj/Tn.

13. A distributed computing system for distributing scheduling of a task within a plurality of nodes without a centralized scheduler controller, the system comprising:

a plurality of heterogeneous interconnected nodes forming a cluster, each respective interconnected node comprising:

a distributed state scheduler, and a respective node database storing performance data about other nodes in the plurality, wherein the performance data comprises historical success rates from prior task execution requests;

a first node of the plurality of interconnected nodes comprising a processor and memory, the memory storing instructions executable on the processor, the instructions causing the processor to:

determine, at the first node in the plurality of interconnected nodes, a first task to be run for the first node by a predetermined time deadline, the first task is configured to be run by a node other than the first node;

calculate a probability of successful completion for candidate worker nodes based on the historical success rates stored in the node database at the first node;

select a first set of worker nodes from the plurality of interconnected nodes using a penalty-based cost function, the first node selects each respective worker node in the first set based on the calculated probability of successful completion for the respective worker node;

send, from the first node to each node in the first set of worker nodes, a request to execute the first task;

notify, if the first node receives an indication that execution of the first task was completed by a second node in the first set before the predetermined time deadline, the first set of worker nodes that the first task is complete thereby causing worker nodes that have started executing the first task to stop their instances;

calculate and associate a first penalty at the first node if the first node does not receive an indication that execution of the first task was completed before the predetermined time deadline, the penalty is calculated as $EP_j = V_j(1 - |C_j|)$, where $V_j$ is a task value and $|C_j|$ is the probability that the first task $j$ will be completed in time; and update performance data in the node database at the first node for each worker node in the first set of worker nodes, the updating modifying the historical success rates based on whether or not the respective worker node succeeded in executing the first task by the predetermined time deadline.

14. The system of claim 13, wherein the memory is further configured for storing instructions executable on the processor, the instructions causing the processor to update performance data, accessed by the first node, for each respective worker node in the first set of worker nodes, the updating indicative of whether or not any one or more of the respective worker nodes have spare computing resources.

15. The system of claim 13, wherein the memory is further configured for storing instructions executable on the processor, the instructions causing the processor to configure each respective worker node in the first set that received a notification that the first task is complete, to stop any instances of the first task running at that node.

16. The system of claim 13, wherein the system comprises a Kubernetes system.

17. The system of claim 13, wherein the performance data comprises data specifying computing resource capability information, for each of the other respective nodes in the plurality of interconnected nodes.

18. The system of claim 13, wherein the performance data comprises data specifying, for each of the other respective nodes in the plurality of interconnected nodes, a set of historical data about the other respective node's responses to at least one past task execution request from the respective interconnected node that accesses the node database.

19. The system of claim 13, wherein the system comprises a modified Kubernetes orchestration system, wherein a standard Kubernetes kube-scheduler includes a modification to support the distributed state scheduler at each node, and wherein the modification enables peer-to-peer scheduling capability while maintaining compatibility with Kubernetes application programming interface (API).

* * * * *